(12) United States Patent
McMahon

(10) Patent No.: US 9,866,739 B2
(45) Date of Patent: *Jan. 9, 2018

(54) SYSTEMS AND METHODS FOR TRANSMITTING AND RECEIVING ARRAY CAMERA IMAGE DATA

(71) Applicant: FotoNation Cayman Limited, San Jose, CA (US)

(72) Inventor: Andrew Kenneth John McMahon, San Carlos, CA (US)

(73) Assignee: FotoNation Cayman Limited, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,199

(22) Filed: Nov. 9, 2015

(65) Prior Publication Data

US 2016/0269626 A1   Sep. 15, 2016

Related U.S. Application Data

(63) Continuation of application No. 14/246,948, filed on Apr. 7, 2014, now Pat. No. 9,197,821, which is a
(Continued)

(51) Int. Cl.
*H04N 5/225* (2006.01)
*H04N 5/247* (2006.01)
(Continued)

(52) U.S. Cl.
CPC ......... *H04N 5/2258* (2013.01); *H04N 5/2253* (2013.01); *H04N 5/2254* (2013.01);
(Continued)

(58) Field of Classification Search
None
See application file for complete search history.

(56) References Cited

U.S. PATENT DOCUMENTS 4,124,798 A   11/1978   Thompson
4,198,646 A   4/1980   Alexander et al.
(Continued)

FOREIGN PATENT DOCUMENTS

CN   1839394 A   9/2006
CN   102037717 A   4/2011
(Continued)

OTHER PUBLICATIONS

US 8,957,977, 02/2015, Venkataraman et al. (withdrawn)
(Continued)

*Primary Examiner* — Justin P Misleh
(74) *Attorney, Agent, or Firm* — KPPB LLP

(57) ABSTRACT

Systems and methods for transmitting and receiving image data captured by an imager array including a plurality of focal planes are described. One embodiment of the invention includes capturing image data using a plurality of active focal planes in a camera module, where an image is formed on each active focal plane by a separate lens stack, generating lines of image data by interleaving the image data captured by the plurality of active focal planes, and transmitting the lines of image data and the additional data.

16 Claims, 7 Drawing Sheets

Related U.S. Application Data continuation of application No. 13/668,057, filed on Nov. 2, 2012, now Pat. No. 8,692,893, which is a continuation of application No. 13/470,252, filed on May 11, 2012, now Pat. No. 8,305,456.

(60) Provisional application No. 61/484,920, filed on May 11, 2011.

(51) Int. Cl.
    H04N 5/232      (2006.01)
    H04N 21/235     (2011.01)
    H04N 21/4223    (2011.01)
    H04N 21/435     (2011.01)

(52) U.S. Cl.
    CPC ......... H04N 5/225 (2013.01); H04N 5/23203 (2013.01); H04N 5/247 (2013.01); H04N 21/235 (2013.01); H04N 21/4223 (2013.01); H04N 21/435 (2013.01)

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 5,005,083 A | 4/1991 | Grage |
| 5,070,414 A | 12/1991 | Tsutsumi |
| 5,144,448 A | 9/1992 | Hornbaker |
| 5,327,125 A | 7/1994 | Iwase et al. |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger et al. |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,340,994 B1 | 1/2002 | Margulis et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,795,253 B2 | 9/2004 | Shinohara |
| 6,819,358 B1 | 11/2004 | Kagle et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,606,484 B1 | 10/2009 | Richards et al. |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |

(56) References Cited

U.S. PATENT DOCUMENTS

| | | |
|---|---|---|
| 8,559,756 B2 | 10/2013 | Georgiev et al. |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1* | 6/2014 | Sarwari .............. H04N 7/181 348/143 |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 9,036,928 B2 | 5/2015 | Venkataraman et al. |
| 9,036,931 B2 | 5/2015 | Venkataraman et al. |
| 9,041,823 B2 | 5/2015 | Venkataraman et al. |
| 9,041,824 B2 | 5/2015 | Lelescu |
| 9,041,829 B2 | 5/2015 | Venkataraman et al. |
| 9,042,667 B2 | 5/2015 | Venkataraman et al. |
| 9,055,233 B2 | 6/2015 | Venkataraman et al. |
| 9,060,124 B2 | 6/2015 | Venkataraman et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 9,185,276 B2 | 11/2015 | Roda et al. |
| 9,188,765 B2 | 11/2015 | Venkataraman et al. |
| 9,191,580 B2 | 11/2015 | Venkataraman et al. |
| 9,197,821 B2 | 11/2015 | McMahan |
| 9,749,568 B2 | 8/2017 | McMahon |
| 2001/0005225 A1 | 6/2001 | Clark et al. |
| 2001/0019621 A1 | 9/2001 | Hanna et al. |
| 2001/0038387 A1 | 11/2001 | Tomooka et al. |
| 2002/0012056 A1 | 1/2002 | Trevino |
| 2002/0027608 A1 | 3/2002 | Johnson |
| 2002/0028014 A1 | 3/2002 | Ono et al. |
| 2002/0039438 A1 | 4/2002 | Mori et al. |
| 2002/0057845 A1 | 5/2002 | Fossum |
| 2002/0063807 A1 | 5/2002 | Margulis |
| 2002/0075450 A1* | 6/2002 | Aratani .............. G02B 3/0056 351/206 |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0003409 A1 | 1/2004 | Berstis et al. |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0141659 A1 | 7/2004 | Zhang et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128595 A1 | 6/2005 | Shimizu |
| 2005/0132098 A1 | 6/2005 | Sonoda et al. |
| 2005/0134698 A1 | 6/2005 | Schroeder |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0038891 A1 | 2/2006 | Okutomi et al. |
| 2006/0039611 A1 | 2/2006 | Rother |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |

(56) References Cited

U.S. PATENT DOCUMENTS

| | | |
|---|---|---|
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210186 A1 | 9/2006 | Berkner |
| 2006/0214085 A1 | 9/2006 | Olsen |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0024614 A1 | 2/2007 | Tam |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0182843 A1 | 8/2007 | Shimamura et al. |
| 2007/0201859 A1 | 8/2007 | Sarrat et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen |
| 2007/0296847 A1 | 12/2007 | Chang et al. |
| 2008/0006859 A1 | 1/2008 | Mionetto et al. |
| 2008/0019611 A1 | 1/2008 | Larkin |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz |
| 2008/0099804 A1 | 5/2008 | Venezia et al. |
| 2008/0106620 A1 | 5/2008 | Sawachi et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0218612 A1 | 9/2008 | Border et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger et al. |
| 2008/0291295 A1 | 11/2008 | Kato et al. |
| 2008/0298674 A1 | 12/2008 | Baker et al. |
| 2009/0027543 A1 | 1/2009 | Kanehiro et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128644 A1 | 5/2009 | Camp, Jr. et al. |
| 2009/0128833 A1 | 5/2009 | Yahav |
| 2009/0129667 A1 | 5/2009 | Ho |
| 2009/0140131 A1 | 6/2009 | Utagawa et al. |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang et al. |
| 2010/0053342 A1 | 3/2010 | Hwang |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |

(56) References Cited

U.S. PATENT DOCUMENTS

| | | |
|---|---|---|
| 2010/0103308 A1 | 4/2010 | Butterfield et al. |
| 2010/0111444 A1 | 5/2010 | Coffman |
| 2010/0118127 A1 | 5/2010 | Nam |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0166410 A1 | 6/2010 | Chang et al. |
| 2010/0165152 A1 | 7/2010 | Lim |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0265381 A1 | 10/2010 | Yamamoto et al. |
| 2010/0265385 A1 | 10/2010 | Knight |
| 2010/0281070 A1 | 11/2010 | Chan et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0321595 A1 | 12/2010 | Chiu et al. |
| 2010/0321640 A1 | 12/2010 | Yeh et al. |
| 2011/0001037 A1 | 1/2011 | Tewinkle |
| 2011/0018973 A1 | 1/2011 | Takayama |
| 2011/0019048 A1* | 1/2011 | Raynor ............. H01L 27/14645 348/302 |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0069189 A1 | 3/2011 | Venkataraman et al. |
| 2011/0080487 A1 | 4/2011 | Venkataraman et al. |
| 2011/0090217 A1 | 4/2011 | Mashitani et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0169994 A1 | 7/2011 | DiFrancesco et al. |
| 2011/0176020 A1 | 7/2011 | Chang |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0228142 A1* | 9/2011 | Brueckner ........... H04N 5/3572 348/241 |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1 | 11/2011 | McMahon |
| 2011/0285866 A1 | 11/2011 | Bhrugumalla et al. |
| 2011/0285910 A1 | 11/2011 | Bamji et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim, II et al. |
| 2012/0012748 A1 | 1/2012 | Pain et al. |
| 2012/0023456 A1 | 1/2012 | Sun et al. |
| 2012/0026297 A1 | 2/2012 | Sato |
| 2012/0026342 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0057040 A1 | 3/2012 | Park et al. |
| 2012/0062702 A1 | 3/2012 | Jiang et al. |
| 2012/0069235 A1 | 3/2012 | Imai |
| 2012/0081519 A1* | 4/2012 | Goma .................... H04N 5/247 348/47 |
| 2012/0105691 A1 | 5/2012 | Waqas et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0163672 A1 | 6/2012 | McKinnon et al. |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0219236 A1 | 8/2012 | Ali et al. |
| 2012/0229628 A1 | 9/2012 | Ishiyama et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262607 A1 | 10/2012 | Shimura et al. |
| 2012/0268574 A1 | 10/2012 | Gidon et al. |
| 2012/0287291 A1 | 11/2012 | McMahon et al. |
| 2012/0293695 A1 | 11/2012 | Tanaka |
| 2012/0307099 A1 | 12/2012 | Yahata et al. |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0088489 A1 | 4/2013 | Schmeitz et al. |
| 2013/0088637 A1 | 4/2013 | Duparre |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |

(56) References Cited

U.S. PATENT DOCUMENTS

| | | |
|---|---|---|
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0002674 A1 | 1/2014 | Duparre et al. |
| 2014/0009586 A1 | 1/2014 | McNamer et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0079336 A1 | 3/2014 | Venkataraman et al. |
| 2014/0092281 A1 | 4/2014 | Nisenzon et al. |
| 2014/0104490 A1 | 4/2014 | Hsieh et al. |
| 2014/0118493 A1 | 5/2014 | Sali et al. |
| 2014/0132810 A1 | 5/2014 | McMahon |
| 2014/0146201 A1 | 5/2014 | Knight et al. |
| 2014/0176592 A1 | 6/2014 | Wilburn et al. |
| 2014/0186045 A1 | 7/2014 | Poddar et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | Mcmahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0091900 A1 | 4/2015 | Yang et al. |
| 2015/0104101 A1 | 4/2015 | Bryant et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2015/0296137 A1 | 10/2015 | Duparre et al. |
| 2015/0312455 A1 | 10/2015 | Venkataraman et al. |

FOREIGN PATENT DOCUMENTS

| | | |
|---|---|---|
| EP | 840502 A2 | 5/1998 |
| EP | 1201407 A2 | 5/2002 |
| EP | 1734766 A2 | 12/2006 |
| EP | 2104334 A1 | 9/2009 |
| EP | 2336816 A2 | 6/2011 |
| JP | 59-025483 | 9/1984 |
| JP | 64-037177 | 7/1989 |
| JP | 02-285772 A | 11/1990 |
| JP | 0715457 A | 1/1995 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001337263 A2 | 12/2001 |
| JP | 2002205310 A | 7/2002 |
| JP | 2002252338 A | 9/2002 |
| JP | 2003094445 A | 4/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2006047944 A | 2/2006 |
| JP | 20060033493 A | 2/2006 |
| JP | 2006258930 A | 9/2006 |
| JP | 20070520107 A | 7/2007 |
| JP | 2007259136 A | 10/2007 |
| JP | 2008055908 A | 3/2008 |
| JP | 2008507874 A | 3/2008 |
| JP | 2008258885 A | 10/2008 |
| JP | 2009132010 A | 6/2009 |
| JP | 2009300268 A | 12/2009 |
| JP | 2011030184 A | 2/2011 |
| JP | 2011109484 A | 6/2011 |
| JP | 2013526801 A | 6/2013 |
| JP | 2014521117 A | 8/2014 |
| KR | 1020110097647 A | 8/2011 |
| TW | 200939739 A | 9/2009 |
| WO | 20070083579 A1 | 7/2007 |
| WO | 2008045198 A2 | 4/2008 |
| WO | 2008108271 A1 | 9/2008 |
| WO | 2008108926 A1 | 9/2008 |
| WO | 2008150817 A1 | 12/2008 |
| WO | 2009151903 A2 | 12/2009 |
| WO | 2011008443 A2 | 1/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |

(56) References Cited

FOREIGN PATENT DOCUMENTS

| WO | 2014032020 A3 | 5/2014 |
|---|---|---|
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012 (Nov. 10, 2012). Retrieved from the Internet at URL:<http://citeseerx.ist.psu.edu/viewdoc/download-?doi=10.1.1.226.2643&rep=rep1 &type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim Syst Sign Process, 2007, vol. 18, pp. 83-101.
Chen et al., "Interactive deformation of light fields", In Proceedings of SIGGRAPH I3D 2005, pp. 139-146.
Chen et al., "KNN Matting", IEEE Transactions on Pattern Analysis and Machine Intelligence, Sep. 2013, vol. 35, No. 9, pp. 2175-2188.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, pp. 191-198.
Fischer et al., "Optical System Design", 2nd Edition, SPIE Press, pp. 49-58.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.

(56) References Cited

OTHER PUBLICATIONS

Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi, et al. "Synthetic Aperture Tracking: Tracking Through Occlusions", ICCV IEEE 11th International Conference on Computer Vision; Publication [online]. Oct. 2007 [retrieved Jul. 28, 2014]. Retrieved from the Internet: <URL: http:l/ieeexplore.ieee.org/stamp/stamp.jsp?tp=&arnumber=4409032&isnumber=4408819>; pp. 1-8.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lai et al., "A Large-Scale Hierarchical Multi-View RGB-D Object Dataset", May 2011, 8 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Lensvector, "How LensVector Autofocus Works", printed Nov. 2, 2012 from http://www.lensvector.com/overview.html, 1 pg.
Levin et al., "A Closed Form Solution to Natural Image Matting", Pattern Analysis and Machine Intelligence, Feb. 2008, vol. 30, 8 pgs.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM SIGGRAPH, 2007, vol. 26, pp. 1-10, [retrieved on Jul. 8, 2015], Retrieved from the Internet <U RL:http://doi.acm.org/10.1145/1276377.1276461 >.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Perwass et al., "Single Lens 3D-Camera with Extended Depth-of-Field", printed from www.raytrix.de, Jan. 2012, 15 pgs.
Pham et al., "Robust Super-Resolution without Regularization", Journal of Physics: Conference Series 124, 2008, pp. 1-19.
Philips 3D Solutions, "3D Interface Specifications, White Paper", Philips 3D Solutions retrieved from www.philips.com/3dsolutions, 29 pgs., Feb. 15, 2008.
Polight, "Designing Imaging Products Using Reflowable Autofocus Lenses", http://www.polight.no/tunable-polymer-autofocus-lens-html--11.html.
Pouydebasquea et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Computer Society, vol. 25, No. 9; Sep. 2003; pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Seitz et al., "Plenoptic Image Editing", International Journal of Computer Vision 48, 2, pp. 115-129.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.

(56) References Cited

OTHER PUBLICATIONS

Taylor, "Virtual camera movement: The way of the future?", American Cinematographer vol. 77, No. 9, Sep. 1996, 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park—Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 1 pg.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
Extended European Search Report for European Application EP12782935.6, report completed Aug. 28, 2014 dated Sep. 4, 2014, 6 Pgs.
Extended European Search Report for European Application EP12804266.0, Report Completed Jan. 27, 2015, dated Feb. 3, 2015, 6 Pgs.
Extended European Search Report for European Application EP12835041.0, Report Completed Jan. 28, 2015, dated Feb. 4, 2015, 6 Pgs.
International Preliminary Report on Patentability for International Application No. PCT/US2012/059813, Completed Apr. 15, 2014, 7 pgs.
International Preliminary Report on Patentability for International Application No. PCT/US2013/059991, dated Mar. 17, 2015, dated Mar. 26, 2015, 8 pgs.
International Preliminary Report on Patentability for International Application PCT/US13/56065, Report dated Feb. 24, 2015, dated Mar. 5, 2015, 4 Pgs.
International Preliminary Report on Patentability for International Application PCT/US13/62720, Report dated Mar. 31, 2015, dated Apr. 9, 2015, 8 Pgs.
International Preliminary Report on Patentability for International Application PCT/US2013/024987, dated Aug. 21, 2014, 13 Pgs.
International Preliminary Report on Patentability for International Application PCT/US2013/027146, Completed Apr. 2, 2013, dated Aug. 26, 2014, 10 pgs.
International Preliminary Report on Patentability for International Application PCT/US2013/039155, completed Nov. 4, 2014, dated Nov. 13, 2014, 10 Pgs.
International Preliminary Report on Patentability for International Application PCT/US2013/046002, dated Dec. 31, 2014, dated Jan. 8, 2015, 6 Pgs.
International Preliminary Report on Patentability for International Application PCT/US2013/048772, dated Dec. 31, 2014, dated Jan. 8, 2015, 8 Pgs.
International Preliminary Report on Patentability for International Application PCT/US2013/056502, Report dated Feb. 24, 2015, dated Mar. 5, 2015, 7 Pgs.
International Preliminary Report on Patentability for International Application PCT/US2013/069932, dated May 19, 2015, dated May 28, 2015, 12 Pgs.
International Preliminary Report on Patentability for International Application PCT/US2014/017766, dated Aug. 25, 2015, dated Sep. 3, 2015, 8 Pgs.
International Preliminary Report on Patentability for International Application PCT/US2014/018084, dated Aug. 25, 2015, dated Sep. 3, 2015, 11 Pgs.
International Preliminary Report on Patentability for International Application PCT/US2014/018116, dated Sep. 15, 2015, dated Sep. 24, 2015, 12Pgs.
International Preliminary Report on Patentability for International Application PCT/US2014/021439, dated Sep. 15, 2015, dated Sep. 24, 2015, 9 Pgs.
International Preliminary Report on Patentability for International Application PCT/US2014/022118, dated Sep. 8, 2015, dated Sep. 17, 2015, 4pgs.
International Preliminary Report on Patentability for International Application PCT/US2014/022123, dated Sep. 8, 2015, dated Sep. 17, 2015, 4 Pgs.
International Preliminary Report on Patentability for International Application PCT/US2014/023762, dated Mar. 2, 2015, dated Mar. 9, 2015, 10 Pgs.
International Preliminary Report on Patentability for International Application PCT/US2014/024407, dated Sep. 15, 2015, dated Sep. 24, 2015, 8Pgs.
International Preliminary Report on Patentability for International Application PCT/US2014/024903, dated Sep. 15, 2015, dated Sep. 24, 2015, 12Pgs.
International Preliminary Report on Patentability for International Application PCT/US2014/024947, dated Sep. 15, 2015, dated Sep. 24, 2015, 7Pgs.
International Preliminary Report on Patentability for International Application PCT/US2014/025100, dated Sep. 15, 2015, dated Sep. 24, 2015, 4 Pgs.
International Preliminary Report on Patentability for International Application PCT/US2014/025904, dated Sep. 15, 2015, dated Sep. 24, 2015, 5 Pgs.
International Preliminary Report on Patentability for International Application PCT/US2014/028447, dated Sep. 15, 2015, dated Sep. 24, 2015, 7Pgs.
International Preliminary Report on Patentability for International Application PCT/US2014/030692, dated Sep. 15, 2015, dated Sep. 24, 2015, 6Pgs.

(56) References Cited

OTHER PUBLICATIONS

International Search Report and Written Opinion for International Application No. PCT/US13/46002, completed Nov. 13, 2013, dated Nov. 29, 2013, 7 pgs.
International Search Report and Written Opinion for International Application No. PCT/US13/56065, Completed Nov. 25, 2013, dated Nov. 26, 2013, 8 pgs.
International Search Report and Written Opinion for International Application No. PCT/US13/59991, Completed Feb. 6, 2014, dated Feb. 26, 2014, 8 pgs.
International Search Report and Written Opinion for International Application No. PCT/US2009/044687, completed Jan. 5, 2010, dated Jan. 13, 2010, 9 pgs.
International Search Report and Written Opinion for International Application No. PCT/US2011/64921, Completed Feb. 25, 2011, dated Mar. 6, 2012, 17 pgs.
International Search Report and Written Opinion for International Application No. PCT/US2013/024987, Completed Mar. 27, 2013, dated Apr. 15, 2013, 14 pgs.
International Search Report and Written Opinion for International Application No. PCT/US2013/027146, completed Apr. 2, 2013, 11 pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2013/048772, Completed Oct. 21, 2013, dated Nov. 8, 2013, 11 pgs.
International Search Report and Written Opinion for International Application No. PCT/US2013/056502, Completed Feb. 18, 2014, dated Mar. 19, 2014, 7 pgs.
International Search Report and Written Opinion for International Application No. PCT/US2013/069932, Completed Mar. 14, 2014, dated Apr. 14, 2014, 12 pgs.
International Search Report and Written Opinion for International Application No. PCT/US2015/019529, completed May 5, 2015, dated Jun. 8, 2015, 10 Pgs.
International Search Report and Written Opinion for International Application PCT/US11/36349, dated Aug. 22, 2011, 11 pgs.
International Search Report and Written Opinion for International Application PCT/US13/62720, completed Mar. 25, 2014, dated Apr. 21, 2014, 9 Pgs.
International Search Report and Written Opinion for International Application PCT/US14/024903 completed Jun. 12, 2014, dated Jun. 27, 2014, 13 pgs.
International Search Report and Written Opinion for International Application PCT/US14/17766, report completed May 28, 2014, dated Jun. 18, 2014, 9 Pgs.
International Search Report and Written Opinion for International Application PCT/US14/18084, report completed May 23, 2014, dated Jun. 10, 2014, 12 Pgs.
International Search Report and Written Opinion for International Application PCT/US14/18116, report completed May 13, 2014, dated Jun. 2, 2014, 12 Pgs.
International Search Report and Written Opinion for International Application PCT/US14/22118, report completed Jun. 9, 2014, dated Jun. 25, 2014, 5 pgs.
International Search Report and Written Opinion for International Application PCT/US14/22774 report completed Jun. 9, 2014, dated Jul. 14, 2014, 6 Pgs.
International Search Report and Written Opinion for International Application PCT/US14/24407, report completed Jun. 11, 2014, dated Jul. 8, 2014, 9 Pgs.
International Search Report and Written Opinion for International Application PCT/US14/25100, report completed Jul. 7, 2014, dated Aug. 7, 2014 5 Pgs.
International Search Report and Written Opinion for International Application PCT/US14/25904 report completed Jun. 10, 2014, dated Jul. 10, 2014, 6 Pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, Report completed Dec. 17, 2012, 8 pgs.
International Search Report and Written Opinion for International Application PCT/US2012/37670, dated Jul. 18, 2012, Completed Jul. 5, 2012, 9 pgs.
International Search Report and Written Opinion for International Application PCT/US2012/58093, Report completed Nov. 15, 2012, 12 pgs.
International Search Report and Written Opinion for International Application PCT/US2014/022123, completed Jun. 9, 2014, dated Jun. 25, 2014, 5 pgs.
International Search Report and Written Opinion for International Application PCT/US2014/024947, Completed Jul. 8, 2014, dated Aug. 5, 2014, 8 Pgs.
International Search Report and Written Opinion for International Application PCT/US2014/028447, completed Jun. 30, 2014, dated Jul. 21, 2014, 8 Pgs.
International Search Report and Written Opinion for International Application PCT/US2014/030692, completed Jul. 28, 2014, dated Aug. 27, 2014, 7 Pages.
International Search Report and Written Opinion for International Application PCT/US2014/064693, Completed Mar. 7, 2015, dated Apr. 2, 2015, 15 pgs.
International Search Report and Written Opinion for International Application PCT/US2014/066229, Completed Mar. 6, 2015, dated Mar. 19, 2015, 9 Pgs.
International Search Report and Written Opinion for International Application PCT/US2014/067740, Completed Jan. 29, 2015, dated Mar. 3, 2015, 10 pgs.
International Search Report and Written Opinion for International Application PCT/US2014/23762, Completed May 30, 2014, dated Jul. 3, 2014, 6 Pgs.
Office Action for U.S. Appl. No. 12/952,106, dated Aug. 16, 2012, 12 pgs.
International Search Report and Written Opinion for International Application PCT/US14/21439, completed Jun. 5, 2014, dated Jun. 20, 2014, 10 Pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Bishop et al., "Light Field Superresolution", Retrieved from http://home.eps.hw.ac.uk/~sz73/ICCP09/LightFieldSuperresolution.pdf, 9 pgs.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.

(56) References Cited

OTHER PUBLICATIONS

Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE—IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Kubota et al., "Reconstructing Dense Light Field From Array of Multifocus Images for Novel View Synthesis", IEEE Transactions on Image Processing, vol. 16, No. 1, Jan. 2007, pp. 269-279.
Li et al., "Fusing Images With Different Focuses Using Support Vector Machines", IEEE Transactions on Neural Networks, vol. 15, No. 6, Nov. 8, 2004, pp. 1555-1561.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Vetro et al., "Coding Approaches for End-To-End 3D TV Systems", Mitsubishi Electric Research Laboratories, Inc., TR2004-137, Dec. 2004, 6 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Xu, Ruifeng, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Ng et al., "Light Field Photography with a Hand-held Plenoptic Camera", Stanford Tech Report CTSR 2005-02, Apr. 20, 2005, pp. 1-11.

* cited by examiner

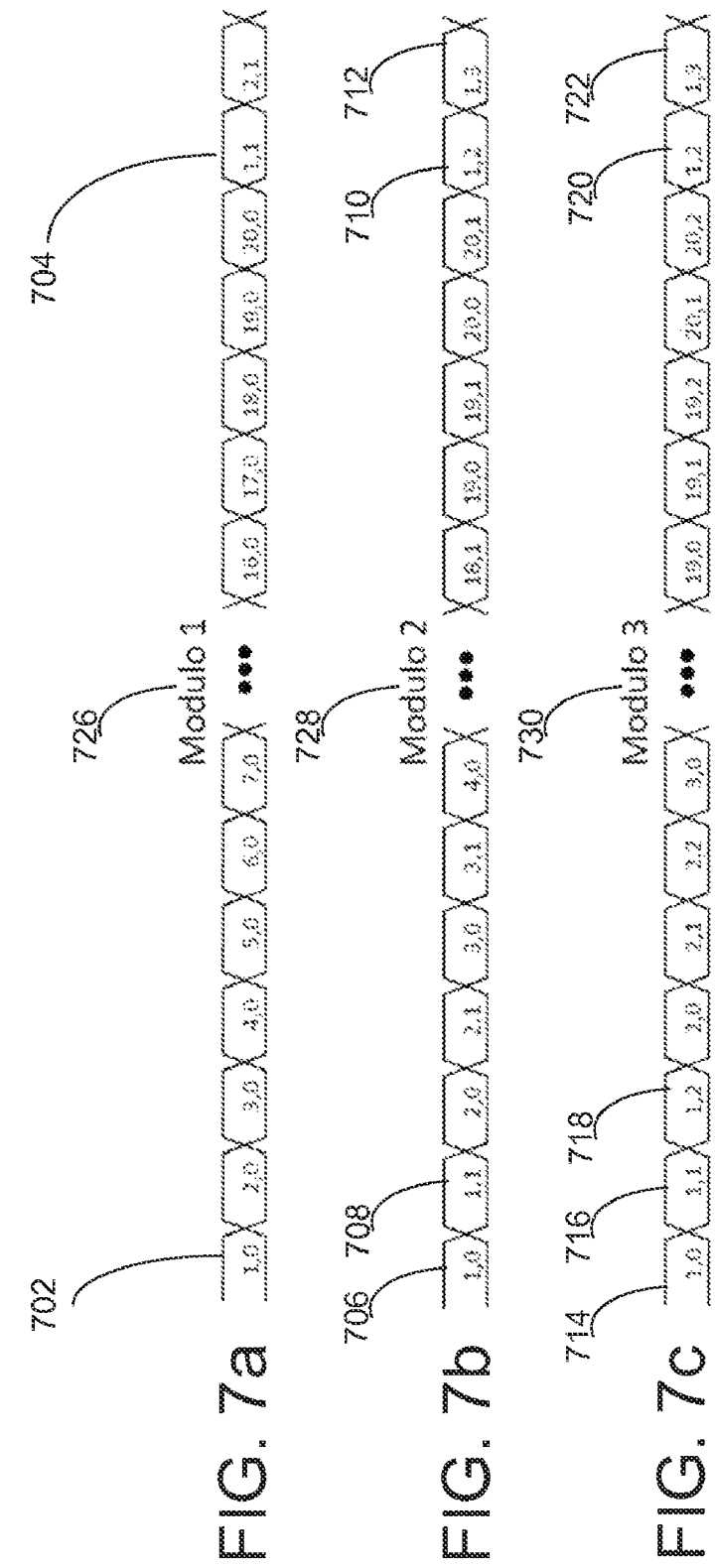

SYSTEMS AND METHODS FOR TRANSMITTING AND RECEIVING ARRAY CAMERA IMAGE DATA

CROSS-REFERENCE TO RELATED APPLICATIONS

This application is a continuation application patent U.S. patent application Ser. No. 14/246,948, filed Apr. 7, 2014, which is a continuation of U.S. patent application Ser. No. 13/668,057 filed Nov. 2, 2012 (now U.S. Pat. No. 8,692,893 issued Apr. 8, 2014), which is a continuation application on U.S. patent application Ser. No. 13/470,252 filed May 11, 2012 (now U.S. Pat. No. 8,305,456, issued Nov. 6, 2012), which application claims priority to U.S. Provisional Patent Application No. 61/484,920, filed May 11, 2011, the disclosure of which is incorporated herein by reference.

FIELD OF THE INVENTION

The present invention is generally related to array cameras and more specifically to the transmission of image data from an imager array to an external device such as a processor.

BACKGROUND OF THE INVENTION

In a typical camera, light enters through an opening (aperture) at one end of the camera and is directed to a focal plane by a lens stack. The lens stack creates an optical channel that forms an image of a scene upon the focal plane. The focal plane includes an array of light sensitive pixels, which are part of a sensor that generates signals upon receiving light via the optical element. Commonly used sensors include CCD (charge-coupled device) sensors and CMOS (complementary metal-oxide-semiconductor) sensors.

Traditional cameras typically use a single focal plane to capture single images, one at a time. The image data from each pixel of the focal plane is then sent directly from the focal plane to a processor. The processor can manipulate the image data, such as to encode the image data, store the image data, forward the image data or modify the image data. In many instances, a standard interface is utilized between the focal plane and processor, which specifies the format in which data is transmitted between the focal plane and the processor.

The Mobile Industry Processor Interface Alliance (MIPI) is a non-profit corporation that has promulgated interface specifications for consistency to promote reuse and compatibility in mobile devices. MIPI has created the Camera Serial Interface 2 (c) interface format (MIPI interface format) for an interface between a camera and a processor.

SUMMARY OF THE INVENTION

Systems and methods in accordance with embodiment of the invention are involve the transmission and/or reception of image data captured by a camera module including a plurality of focal planes. In several embodiments, the image data is used to generate lines of image data that interleave image data captured by the pixels of different focal planes. In many embodiments, the sensor in the camera module also generates additional data describing the captured image data. In a number of embodiments, the additional data is transmitted with the lines of image data and used by the interface circuitry on a device receiving the lines of image data to identify which pixels in the lines of image data are associated with one or more of the plurality of images captured by the focal planes of the camera module.

One embodiment of the invention includes capturing image data using a plurality of active focal planes in a camera module, where an image is formed on each active focal plane by a separate lens stack, generating lines of image data by interleaving the image data captured by the plurality of active focal planes, and transmitting the lines of image data and the additional data.

A further embodiment also includes additional data providing information for deinterleaving a plurality of images from the captured image data and transmitting the additional data with the lines of image data.

In another embodiment, the additional data describes the imager array.

In a still further embodiment, the additional data includes data selected from the group of additional data describing: the number of focal planes in the imager array; the dimensions of the array of focal planes in the imager array; the number of pixels in each dimension of the active focal planes; the integration time of the pixels in each of the active focal planes; and the gain of the pixels in each of the active focal planes In still another embodiment, the additional data describing the gain of pixels includes additional data describing the analog gain of the pixels in each of the active focal planes and additional data describing the digital gain of the pixels in each of the active focal planes.

In a yet further embodiment, generating the lines of image data further comprises combining captured image data from the plurality of active focal planes using a predetermined process.

In yet another embodiment, the predetermined process is selected from a plurality of predetermined processes for combining captured image data, and the additional data includes additional data indicating the predetermined process used to combine the captured image data.

In a further embodiment again, each active focal plane comprises an array of pixels including a plurality of rows of pixels that also form a plurality of columns of pixels, and the predetermined process for combining captured image data comprises interleaving image data from a row selected from each of the active focal planes.

In another embodiment again, the predetermined process for combining captured image data comprises using a modulo process, where the modulo process involves combining the image data captured by each of the pixels in the selected rows of the active focal planes by interleaving predetermined numbers of pixels from each of the selected rows.

In a further additional embodiment, the additional data describes at least one of the lines of image data.

In another additional embodiment, the additional data includes data selected from the group consisting of additional data describing: the time at which each active focal plane started capturing the image data; and the row numbers of the rows in each of the active focal planes used to capture the image data used to generate the line of image data.

A still yet further embodiment also includes packetizing the lines of image data and the additional data describing the captured image data to produce at least one packet of data. In addition, transmitting the lines of image data and the additional data further comprises transmitting the at least one packet of data.

In still yet another embodiment the packet of data includes a packet header containing at least a portion of the additional data and a plurality of lines of image data, and the additional data contained in the packet header describes the imager array.

In a still further embodiment again, the packet of data further includes a packet footer indicating the end of the transmission of the plurality of lines of image data.

In still another embodiment again, the packet of data comprises a plurality of lines of image data and a line header associated with each of the plurality of lines of image data, and each line header includes additional data describing the line of image data with which the line header is associated.

In a yet further embodiment again, the line head further comprises additional data describing the imager array.

Yet another embodiment again also includes pausing transmission during frame blanking intervals, transmitting the plurality of lines of image data and the additional data describing the captured image data between frame intervals, and pausing during the transmission of the plurality of lines of image data and the additional data describing the captured image data during line blanking intervals.

A yet further additional embodiment also includes continuously transmitting the lines of image data and the additional data until all of the data is transmitted.

In yet another additional embodiment each lens stack in the camera module has a different field of view.

An embodiment of a method for receiving image data includes receiving image data from a camera module including a plurality of focal planes using interface circuitry, where the image data comprises lines of image data generated by interleaving pixels from a plurality of images captured using the plurality of focal planes, and identifying the pixels in the image data that are part of at least one of the plurality of images using the interface circuitry.

In a further embodiment of a method for receiving image data, the camera module also generates additional data describing the captured image data and the method further includes receiving the additional data, and identifying the pixels in the image data that are part of at least one of the plurality of images using the interface circuitry further comprises identifying the pixels in the image data that are part of at least one of the plurality of images using the additional data.

In another embodiment of a method for receiving image data, the additional data includes data selected from the group consisting of additional data describing: the number of focal planes in the imager array; the dimensions of the array of focal planes in the imager array; the number of pixels in each dimension of the focal planes; the integration time of the pixels in each of the focal planes; and the gain of the pixels in each of the focal planes.

In a yet further embodiment, the additional data describing the gain of pixels includes additional data describing the analog gain of the pixels in each of the active focal planes and additional data describing the digital gain of the pixels in each of the active focal planes.

In yet another embodiment, the received lines of image data are generated using one of a plurality of predetermined processes, and the additional data identifies the predetermined process used to generate the lines of image data.

In a further embodiment again, the interface circuitry includes a processor configured to identify the pixels in the image data that are part of at least one of the plurality of images.

An embodiment of a system for receiving image data in accordance with an embodiment of the invention includes interface circuitry configured to receive image data from a camera module including a plurality of focal planes, where the image data comprises lines of image data generated by interleaving pixels from a plurality of images captured using the plurality of focal planes. In addition, the interface circuitry is further configured to identify the pixels in the image data that are part of at least one of the plurality of images using the interface circuitry.

In a further embodiment of a system for receiving image data, the camera module also generates additional data describing the captured image data and the interface circuitry is further configured to receive the additional data, and identify the pixels in the image data that are part of at least one of the plurality of images using the additional data.

In another embodiment of a system for receiving image data, the additional data includes data selected from the group of additional data describing: the number of focal planes in the imager array; the dimensions of the array of focal planes in the imager array; the number of pixels in each dimension of the focal planes; the integration time of the pixels in each of the focal planes; and the gain of the pixels in each of the focal planes.

In a still further embodiment, the additional data describing the gain of pixels includes additional data describing the analog gain of the pixels in each of the focal planes and additional data describing the digital gain of the pixels in each of the focal planes.

In still another embodiment, the interface circuitry includes a processor configured to identify the pixels in the image data that are part of at least one of the plurality of images.

BRIEF DESCRIPTION OF THE DRAWINGS

FIGS. 7a-7c conceptually illustrate lines of image data transmitted by interleaving image data from multiple focal planes using modulo processes in accordance with an embodiment of the invention.

DETAILED DESCRIPTION

Figure 1:
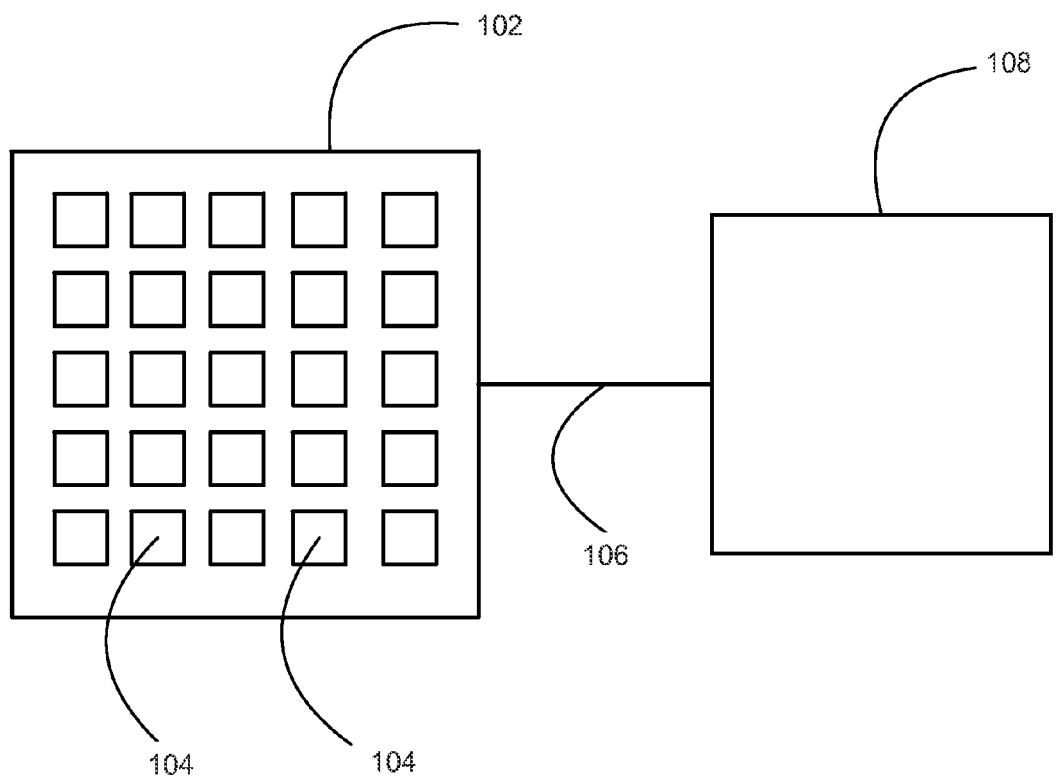
FIG. 1 illustrates an array camera in accordance with an embodiment of the invention.

Turning now to the drawings, systems and methods for transmitting and receiving image data captured by an imager array are illustrated. In several embodiments, the imager array is configured to transmit image data to a processor and additional data describing the image data that is being transmitted. A device receiving the image data can use the additional data to reconstruct a plurality of images of a scene captured by the imager array (often referred to as a light field). In several embodiments, the image data and the additional data describing the image data are transmitted as a packet of image data that can include a packet header as well as lines of image data, where each line of image data is preceded by a line header. The lines of image data include the image data captured by focal planes of the imager array and can be utilized to construct a plurality of images of a scene. The line header can include data identifying the particular pixels and focal planes that are included in a line of image data. In embodiments where a packet header is present, the packet header can include embedded data that describes the camera module to enable a processor to construct images from the packet of image data.

In a variety of embodiments, a line of image data can correspond to a row, column or any organization of image data corresponding to particular pixels from an image captured by one or more of the focal planes in the imager array. In many embodiments, a line of image data can include specific pixels from some or all of the focal planes of an imager array.

All of the image data captured by a focal plane in the imager array can constitute a low resolution image (the term low resolution here is used only to contrast with higher resolution images that can be synthesized through super-resolution processing), which the processor can use in combination with other images captured by the imager array to construct a higher resolution image through super-resolution processing. Super-resolution processing is discussed in U.S. patent application Ser. No. 12/967,807 entitled "Systems and Methods for Synthesizing High Resolution Images Using Super-Resolution Processes", filed Dec. 14, 2010, the disclosure of which is hereby incorporated by reference in its entirety. The processes for transmitting multiple images in accordance with embodiments of the invention are more general, however, than transmitting images to a processor for performing super-resolution processing. Accordingly, processes in accordance with embodiments of the invention can be used to transmit captured image data for multiple images of a scene in a variety of applications including but not limited to slow motion video applications involving registering of images captured from different perspectives, and conventional video applications involving the capture of a sequence of sets of images to synthesize a sequence of high resolution frames using super-resolution processes.

In a number of embodiments, the imager array is configured to transmit image data generated by focal planes via an interface format. The captured image data is transmitted in accordance with the interface format as a packet. These packets can be adapted to accord with any interface format, including but not limited to the MIPI CSI-2 interface format (MIPI interface format).

Imager arrays, interface formats used to transfer captured image data between imager arrays and processors, and processes for formatting captured image data into packets for transfer via an interface format in accordance with embodiments of the invention are discussed further below.

System Architecture

Array cameras in accordance with many embodiments of the invention can include a camera module and a processor. The camera module can include an array of cameras. In various embodiments, an array camera includes a camera module and a processor. A camera module can include an imager array, which is a sensor that includes an array of focal planes. Each focal plane includes an array of pixels used to capture an image formed on the focal plane by a lens stack. The focal plane can be formed of, but is not limited to, traditional CIS (CMOS Image Sensor), CCD (charge-coupled device), high dynamic range sensor elements, multispectral sensor elements and various alternatives thereof. In many embodiments, the pixels of each focal plane have similar physical properties and receive light through the same lens stack. Furthermore, the pixels in each focal plane may be associated with the same color filter. In a number of embodiments, at least one of the focal planes includes a Bayer-pattern filter. In several embodiments, the focal planes are independently controlled. In other embodiments, the operation of the focal planes in the imager array is controlled via a single set of controls.

An array camera in accordance with an embodiment of the invention is illustrated in FIG. 1. The array camera 100 includes a camera module 102 that is configured to transmit (106) image data to a receiving device 108 via an interface format involving the transmission of additional data describing the transmitted image data. The camera module 102 includes an array of cameras 104. The cameras 104 in the camera module 102 are formed from the combination of a lens stack and a focal plane. The camera module 102 can include an optic array of lens stacks and an imager array of focal planes. These multiple cameras 104 may be active or inactive at any given time. Array cameras are discussed in U.S. patent application Ser. No. 13/106,797 entitled "Architectures for imager arrays and array cameras" and U.S. patent application Ser. No. 12/952,106 entitled "Capturing and processing of images using monolithic camera array with heterogeneous imagers" the disclosure of both applications is hereby incorporated by reference in its entirety. The image data captured by these multiple cameras is sent from the focal planes of each camera to a processor. The focal planes may have different imaging characteristics, such as varying exposure times, start times, and end times. Therefore, the timing of the transmission of the image data captured by each focal plane can vary. Accordingly, the imager array can transmit additional data describing the image data to enable a device receiving the image data to appropriately reconstruct images from the received image data.

In many embodiments, the array camera 100 captures images using a plurality of cameras 104, which can have different imaging characteristics. The array camera 100 can separately control each of the cameras to obtain enhanced image capture and/or to enhance processes such as (but not limited to) super-resolution processes that may be applied to the captured images. For example, each pixel of a focal plane may capture different wavelengths of light, or may capture the intensity of light, varying exposure times, start times, or end times. Once the array camera 100 has commenced capturing image data using the pixels on the imager array, the focal planes can commence transmitting the image data captured using the pixels to a receiving device 108. The image data captured by different camera modules can be interleaved for transmission to a receiving device 108 that includes interface circuitry configured to receive image data. In many embodiments, the interface circuitry is implemented in hardware and/or using a processor. The receiving device 108 can then organize the captured image data from the received packet and appropriately combine the image data to reconstruct the image(s) captured by one or more of the focal planes in the imager array.

In the illustrated embodiment, multiple images of a scene can be captured by the camera module 102. As the image data is captured, the camera module 102 transmits (106) the image data to a receiving device 108. The camera module 102 transmits the image data using a small number of local data storage cells on the camera module 102 that store the captured image data following capture by the cameras. The camera module 102 manages the capture and transmission of image data so that the captured image data stored in the storage cells is transmitted by the imager array 102 in the time taken to capture and load the next set of image data into the storage cells. In this way, the camera module can continuously buffer and transmit image data using a number of local data storage cells that is less than the total number of pixels in the camera module.

A line of image data transmitted by an imager array can be considered to equal the number of pixels in a row (column) of a focal plane multiplied by the number of focal planes. In several embodiments, the clock frequency of transmitter circuitry on the imager array is set to a desired output data rate and the internal focal plane pixel rate is set to 1/N the desired output data rate (where N is the total number of focal planes). In many image transmission protocols, once a start of line condition is sent, all of image data is transmitted without interrupt until the end of line. Accordingly, a sufficient number of data storage cells and a buffering mechanism can be developed that starts transmission of pixels once there are sufficient pixels stored such that all of the pixels will have been captured and transmitted by the time the end of the line of image data is reached. If, for example, an imager array including 16 focal planes (as in a 4×4 array) transmits image data from all focal planes, then there is very little data storage utilized prior to the start of focal plane readout, because the data is transmitted at approximately the rate at which it is being read. If, however, the same imager array only has one active imager, then almost all of the pixels from a row (column) of the focal plane are stored since the buffer is being read 16 times as fast as it is being written. Therefore, the data storage requirement would be one row of pixels (i.e. $1/16^{th}$ of a line of image data). When eight focal planes are active, half the data from all eight focal planes is buffered before transmission commences to avoid underflow. Therefore, the total number of data storage cells utilized is equal to four rows of pixels or one quarter of a line of image data. The above examples illustrate how the data storage requirements of an imager array can vary based upon the number of active focal planes. In many embodiments, the total number of storage cells within an imager array is less than a quarter of a line of image data. In several embodiments, the total number of storage cells within an imager array is equal to a line of image data. In several embodiments, the total number of data storage cells is between a quarter of a line of image data and a full line of image data. In a number of embodiments, the total number of storage cells is equal to or greater than a line of image data. When the camera module transmits the captured image data, the incorporation of additional data describing the image data enables a peripheral device receiving the image data to reconstruct the images captured by each active camera in the imager array 102.

Imager arrays in accordance with many embodiments of the invention are configured to output image data via an interface format that accommodates the transfer of image data captured via multiple focal planes. In several embodiments, the imager array is configured to transmit captured image data in accordance with an interface format that is compatible with standard interface formats, such as (but not limited to) the MIPI CSI-2 interface format (MIPI interface format), the Camera Link interface format, and any of the Universal Serial Bus (USB) interface formats or FireWire interface formats. When image data captured from multiple focal planes is output by the imager array, the device receiving the image data is faced with the task of assembling the image data into a plurality of images of a scene.

Although specific array camera system architectures are discussed above, any of a variety of system architectures for array cameras can be utilized as appropriate to the requirements of a specific application in accordance with embodiments of the invention. The transmission of image data captured by a plurality of focal planes on an imager array and additional data describing the image data that enables a receiver to reconstruct images from the image data in accordance with embodiments of the invention is discussed below.

Identification of Focal Planes

Figure 2:
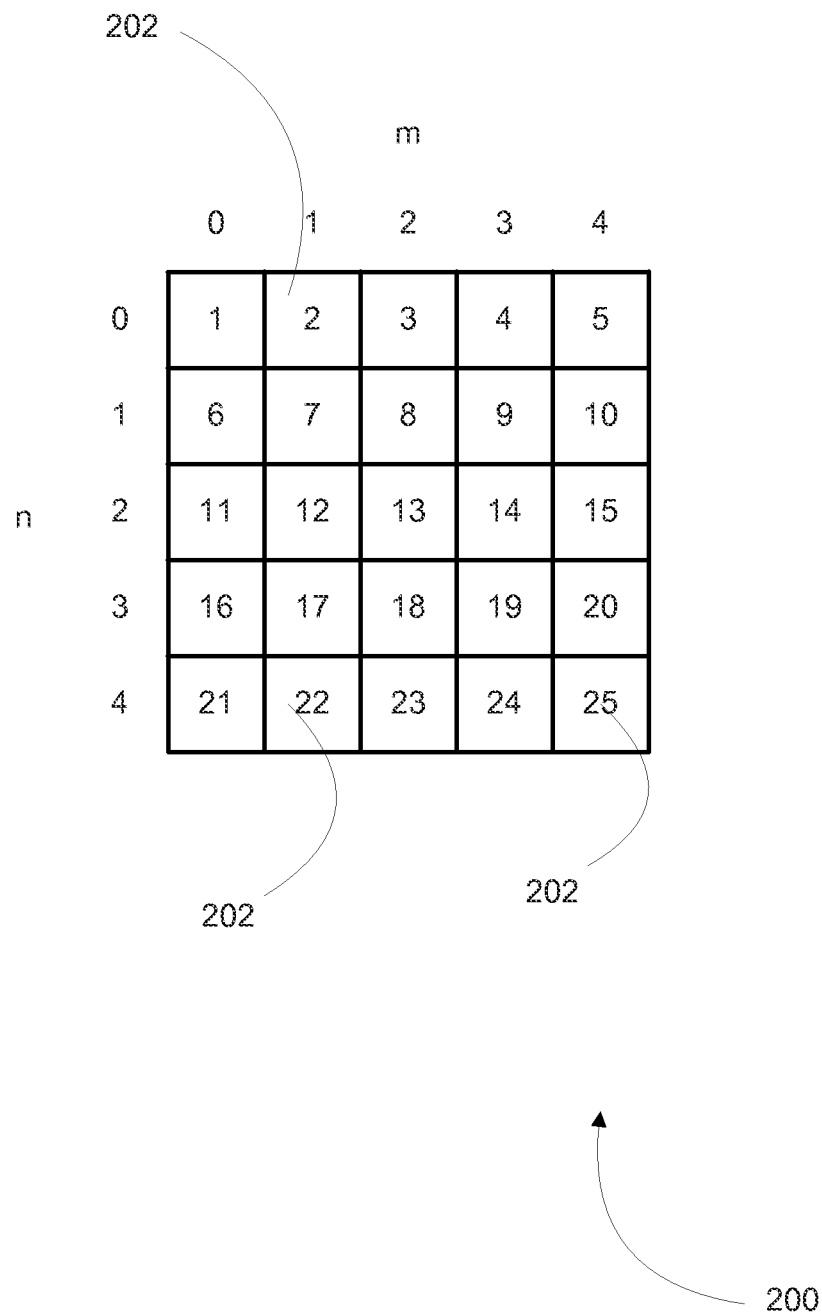
FIG. 2 illustrates an imager array in accordance with an embodiment of the invention.

Due to the fact that imager arrays in accordance with many embodiments of the invention can capture image data using more than one focal plane, processes for transmitting the captured image data include mechanisms for identifying the specific focal plane used to capture a specific set of image data. A convention is typically adopted for identifying specific focal planes within an imager array. Focal planes on an imager array in accordance with an embodiment of the invention are conceptually illustrated in FIG. 2. The illustrated imager array 200 includes a 5×5 array of focal planes 202. Each focal plane 202 includes an array of pixels.

The focal planes on an imager array can be considered to be arranged in a matrix of "M" rows of focal planes, on a row axis notated as "m", and "N" columns of focal planes, on a column axis notated as "n." Individual focal planes can be identified based upon their location within the imager array. In certain embodiments, a numbering convention is used in which the focal plane number is defined by the following equation:

$$\text{Focal plane number} = (m + (n*M)) + 1$$

where m is the horizontal index into the imager array from 0 to M−1;
  n is the vertical index into the imager array from 0 to N−1;
  M is the total number of focal planes in the horizontal direction; and
  N is the total number of focal planes in the vertical direction.

In the illustrated embodiment, the horizontal index, or row, of focal planes is numbered from 0 to 4. The vertical index, or column, of focal planes is numbered from 0 to 4. Thereby, each row and column has 5 focal planes for a total number of 25 focal planes in the illustrated array of focal planes. In many embodiments, the numbering starts at the top left corner of the imager array. In other embodiments, alternative conventions are used to number the focal planes.

Although specific focal plane numbering conventions are discussed above, any of a variety of different conventions can be utilized to identify a focal plane. Given a specific convention, the identity of a focal plane utilized to capture specific image data can be transmitted with the image data. Processes for transmitting image data with information identifying the focal plane that captured the image data are discussed further below.

Packetizing Image Data Captured by Multiple Focal Planes

Figure 3:
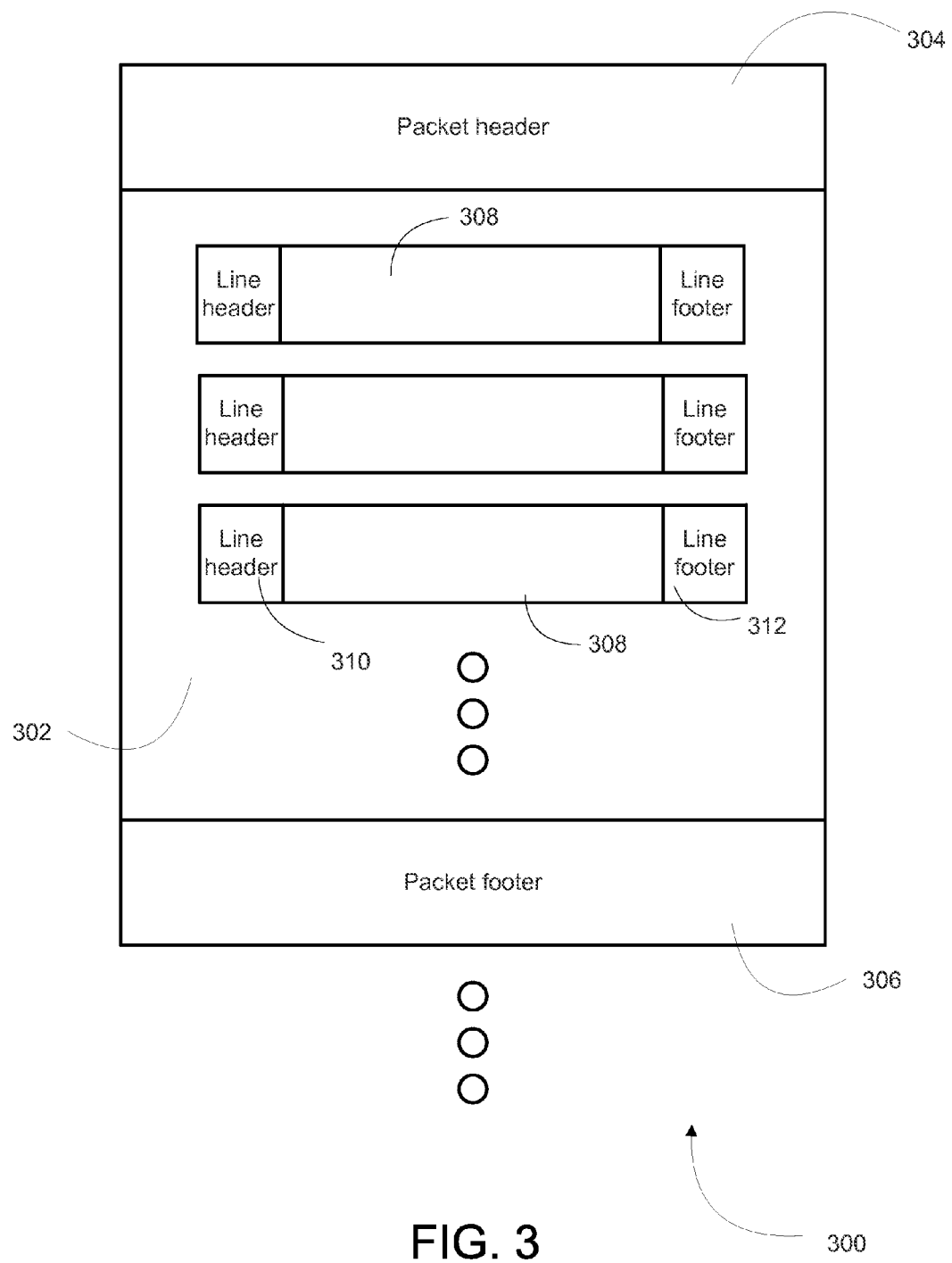
FIG. 3 illustrates image data transmitted as packets in accordance with an embodiment of the invention.

In several embodiments, image data from a plurality of focal planes can be packetized by inserting the image data and/or additional data describing the image data into a packet in such a way that a processor can reconstruct images of a scene from the received image data. A conceptual illustration of a packet including image data and additional data describing the image data transmitted by an imager array in accordance with an embodiment of the invention is illustrated in FIG. 3. The packet 302 includes a packet header 304 and a packet footer 306. The packet 302 also includes a number of lines 308 of image data, where each line 308 of image data includes a line header 310 and a line footer 312. In many embodiments, the packet header 304 and/or the line header 310 contain additional data that describes the image data in such a way that a device receiving the packet can reconstruct a plurality of images using image data including the lines of image data contained within the packet. The number of lines of image data included within the packet typically depends upon the requirements of a specific application. In many embodiments, the packet can contain all of the lines of image data for a single captured light field. The term light field can be used to describe a number of two dimensional images that are captured of a scene from different perspectives. In other embodiments, the lines of image data of a captured light field can be divided and sent in multiple packets. In many embodiments, image data captured by individual pixels or groups of pixels from within a line of pixels from different focal planes can be interleaved within a packet of image data.

In a number of embodiments, the packet header 304 contains embedded data. In many embodiments, the embedded data describes the camera module from which image data is generated in such a way that a processor can determine the structure of the image data in the packet and reconstruct images from the data received from the camera module. In several embodiments, a packet header 304 includes embedded data such as (but not limited to) the number of focal planes in an imager array, the timing of the image capture per focal plane, the identity of the particular focal planes being read out, the total number of pixels in a focal plane, the resolution of an image taken by a focal plane, the timing of the pixel read outs and the gain for the focal plane. As discussed below, the embedded data described above need not be included in a packet header and some or all of the information can be transmitted accompanying image data in different ways including but not limited to locating the additional data elsewhere in the packet and/or transmitting the additional data in a separate packet. Embedded data describing imaging data in accordance with embodiments of the invention is discussed further below.

In the illustrated embodiment, the lines 308 of image data include line headers 310. The line header identifies the focal plane or focal planes and pixels in the imager array that captured the image data contained within the line of image data. A processor can utilize the line header to identify the specific image data contained within the line 310 of image data. In various embodiments, a line header 310 includes information such as (but not limited to) the identify of the focal plane that captured the image data within the line and/or the identity of the specific pixels(s) or group of pixels used to capture the image data contained within the line of data, and a timestamp. Stated another way, a line of image data within a packet formatted in accordance with embodiments of the invention need not correspond to image data captured using a single line of pixels in a single focal plane. Indeed, packets of image data in accordance with embodiments of the invention can include lines of image data containing image data captured by different lines of pixels and/or from different focal planes. Inclusion of the additional data describing the line of image data in the line header allows a processor to receive and process image data from multiple images multiplexed into a single packet or stream of packets. Different types of embedded data that can be included in line headers (or elsewhere) in accordance with embodiments of the invention are discussed further below.

Each line 308 of image data can include a line footer 312 to indicate that the line of image data 308 associated with the preceding line header 310 has ended. Also, each packet 302 can include a packet footer 306 to indicate that the image data associated with the previous packet header 304 has ended. In many embodiments, the imager array is configured to generate multiple packets 302 to contain the image data captured by the focal planes and each packet includes multiple lines of image data.

Due to the manner in which image data is captured by different sets of pixels in different focal planes as data is transmitted by the imager array, the processor typically cannot predict the order in which it will receive image data from the imager array. In many embodiments, the processor has no knowledge of the focal plane or focal planes that captured the image data contained within a line of image data without reference to the packet header and/or the line header for the line of image data. However, in other embodiments the imager array imposes constraints with respect to the order in which image data is captured by specific focal planes (see for example the discussion below with respect to FIGS. 7a-7c) and a processor can rely upon the predetermined order of image data capture to reconstruct the image data. While imposing constraints on the order in which image data is captured can reduce the flexibility of the image array with respect to the manner in which image data is captured from different focal planes, the predictable manner in which image data is received from the imager array can result in the reduction in the amount of additional data transmitted in conjunction with the image data by removing information that identifies the focal plane and/or pixels that captured the image data. In many embodiments, the manner in which the imager array is constrained to capture image data enables the packet header, the packet footer, the line header and/or the line footer illustrated in FIG. 3 to be eliminated.

Although the inclusion of specific pieces of information within packet headers and/or line headers is described above, any information that enables the reconstruction of multiple images from image data multiplexed into a single packet or stream of packets can be incorporated into a packet of image data in accordance with embodiments of the invention. Transmission of image data compatible with the MIPI interface format is discussed further below.

Image Data Transmission Compatible with the MIPI Interface Format

Figure 4:
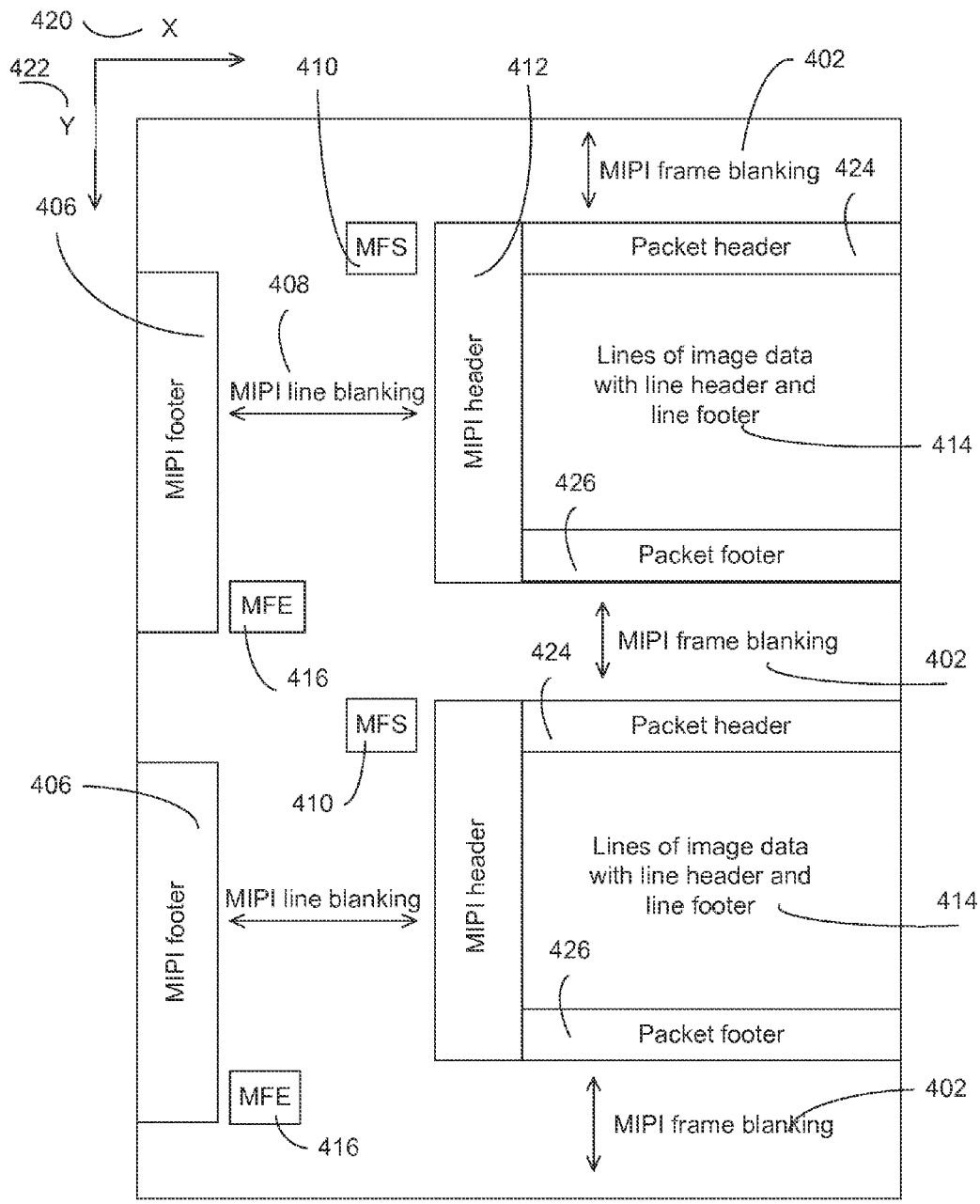
FIG. 4 illustrates transmission of image data as packets compatible with the MIPI CSI-2 standard interface format in accordance with an embodiment of the invention.

In several embodiments, imager arrays transmit image data and additional data describing the image data in a manner that is compatible with an existing interface format for the transmission of image data by a conventional camera including a single focal plane. A conceptual illustration of image data and additional data describing the image data transmitted as packets compatible with the MIPI CSI-2 standard interface format (MIPI interface format) in accordance with an embodiment of the invention is illustrated in FIG. 4. The conceptual illustration can be read as involving transmissions from left to right in the X direction 420 and from top to bottom in the Y direction 422. The transmission begins with a MIPI frame blanking interval 402. A MIPI frame start (MFS) 410 indicator is then sent by the imager array, followed by a portion of the MIPI header 412. A packet of data generated in accordance with embodiments of the invention is inserted within the standard MIPI container as embedded data. Accordingly, the first line of data within the MIPI container can include a packet header 424 containing information concerning the focal planes that generated the image data (see discussion above).

The transmission of the first line of the MIPI container is completed by the transmission of a MIPI footer 406. There is a pause during the MIPI line blanking interval 408, and then the next portion of the MIPI header 412 is transmitted. The next line of the MIPI container includes a line of image data 414. In embodiments where the order in which the lines of image data transmitted by the imager array is not predetermined, the line of image data can be preceded by a line header and followed by a line footer. In embodiments where the lines of image data are transmitted in a predetermined order (see for example the discussion of FIGS. 7*a*-7*c*), a line header and/or line footer may not be utilized.

The process of transmitting a MIPI footer, pausing during a MIPI line blanking interval, transmitting a portion of the MIPI header, and transmitting lines of image data within the MIPI container continues until all the lines of image data in the packet are transmitted. In several embodiments, an embedded packet footer is transmitted in the MIPI container to indicate that the transmission of the packet is complete. Following the transmission of the packet, the transmission of the MIPI container is completed by transmitting a MIPI footer 406 and a MIPI frame end 416. Although the packet illustrated in FIG. 4 involves transmitting one line of image data between line blanking intervals of the MIPI container, in many embodiments the packet header and the lines of image data do not correspond with the line blanking intervals of the MIPI container. Stated another way, a single line blanking interval of the MIPI container can contain image data from two or more lines of image data. Accordingly, the line headers and/or line footers are utilized to identify the individual lines of image data within the container.

As can readily be appreciated, the process illustrated in FIG. 4 involves formatting a packet of data including image data and additional data describing the image data generated in accordance with embodiments of the invention within a conventional MIPI container. In this way, an imager array can utilize an interface standard developed to enable the transmission of image data captured by a single focal plane to enable transmission of a packet of data containing image data captured by a plurality of focal planes (i.e. a light field). In other embodiments, similar processes can be utilized to transmit packets formatted in the manner outlined above using other containers and/or interface formats including (but not limited to) a CameraLink interface format, a USB interface format, or a Firewire interface format.

Additional Data Describing an Imager Array

Imager arrays in accordance with many embodiments of the invention additional data describing the imager array that can be embedded in a packet header or elsewhere in image data transmitted by the imager array. A processor can utilize the additional data describing the imager array to reconstruct images from the image data contained within the packet. In various embodiments, the additional data describing the imager array is divided into fixed descriptors and dynamic descriptors. Fixed descriptors are pieces of data within a packet header that are fixed values that are specific to an array camera configuration, and which do not change during array camera operation. Dynamic descriptors are pieces of data within the embedded data that can vary during array camera operation. In many embodiments, dynamic descriptors are parameters describing the operational states such as (but not limited to) focal plane exposure time or focal plane processing gain. In several embodiments, an imager array transmits image data and additional data including at least one of the total number of focal planes, the total number of pixels being read out per focal plane in a first dimension, the total number of pixels being read out per focal plane in a second dimension, the integration time of the pixels in each focal plane, and the gain applied to each pixel in each focal plain (which can be divided into analog gain and digital gain). The specific data transmitted describing the imager array typically depends upon the information that is provided to the receiving device about the imager array by other sources. In many embodiments, imaging characteristics such as the integration time can be specified by a receiving device such as a processor and the information is transmitted by the imager array to communicate to the receiving device that the imaging characteristics of the relevant focal planes have been updated in response to the instruction. In many embodiments, an imager array transmits image data and the gain applied to each pixel in each focal plain (which can be divided into analog gain and digital gain), and additional data including the integration time of the pixels in the active focal planes and at least one of the total number of focal planes, the total number of pixels being read out per focal plane in a first dimension, the total number of pixels being read out per focal plane in a second dimension. In other embodiments, any of a variety of combinations of information including additional pieces of information can be transmitted as additional data describing image data in accordance with embodiments of the invention.

In many embodiments, a transmitter within an imager array includes additional data describing the imager array in the packet header to allow the receiver within a processor to determine the structure of the data in a packet in order for the software in the processor to reconstruct the image data from the camera. The additional data describing the imager array in the packet header is largely dependent upon the specific application and array camera configuration.

In several embodiments, the additional data describing the imager array is transmitted as embedded data within a MIPI container using the embedded 8-bit non image data (datatype=0x12) format specified as part of the MIPI interface standard. The following table provides the structure of various fixed descriptors that can be utilized in additional data describing an imager array transmitted in accordance with many embodiments of the invention. Unless otherwise stated the byte order is MSB first. In several embodiments, one, multiple, and/or all of the following fixed descriptors can be included as embedded data within a packet header:

| Name | Length (bytes) | Description |
|---|---|---|
| Data ID | 5 | Fixed field start of embedded data. Value is ASCII character string "PICAM". |
| Device ID | 4 | Device identification word. A product specific code. |
| Revision ID | 2 | Silicon revision word. Describes the version of the silicon |
| Manufacturer ID | 8 | Manufacturer identifier. |
| Array format M, N | 1 | Number of focal planes in M and N, where M is the number of focal planes per row in the imager array and N is the number of focal planes per column in the imager array. Upper 4 bits denote number of the focal planes along the X axis. |
| Start of focal plane image data capture time tag counter frequency | 2 | The frequency used to generate the start of focal plane image data capture time tag counter frequency values. The frequency is represented using a 16-bit fixed precision 8.8 format (0 to 255.99609 MHz in 0.00390625 MHz steps). |

The following table provides the structure of various dynamic descriptors that can be utilized in the additional data describing an imager array transmitted in accordance with embodiments of the invention. Unless otherwise stated the byte order is MSB first. In several embodiments, one, multiple, and/or all of the following dynamic descriptors can be included as embedded data within a packet header:

| Name | Length (bytes) | Description |
| --- | --- | --- |
| Active Focal Planes | 8 | One hot encoding of which focal planes are being readout in the upcoming packet. This provides information on which focal planes are active and providing image data. Supporting up to 64 focal planes. Each bit corresponds to a single focal plane within the array with a 1 indicating a given focal plane is being readout. The bit assignment corresponds to the scalar version of the focal plane number format. |
| Total pixels X | 2*M*N | Number of pixels being readout per focal plane in X. Each focal plane has a 16 bit word. The focal plane ordering corresponds to the scalar version of the focal plane number format. Inactive focal plane (focal plane not part of the readout) are set to 0x0000h. |
| Total pixels Y | 2*M*N | Number of pixels being readout per focal plane in Y. The focal plane ordering corresponds to the scalar version of the focal plane numbering format. Inactive focal planes (focal planes not part of the readout) are set to 0x0000h. |
| Integration Time | 3*M*N | Integration time per focal plane (corresponding to the first row of image data in the upcoming packet) in units of microseconds. The focal plane ordering corresponds to the scalar version of the focal plane numbering format. Inactive focal planes (focal planes not part of the readout) are set to 0x000000h. |
| Analog Gain | 1*M*N | Analog Gain per focal plane (corresponding to the first row of image data in the upcoming focal plane) in linear units. The gain is represented using an 8 bit fixed point 5.3 format (0 to 31.875x in 0.125 steps). The focal plane ordering corresponds to the scalar version of focal plane numbering format. Inactive focal planes (focal planes not part of the readout) are set to 0x00h. |
| Digital Gain | 1*M*N | Digital gain per focal plane (corresponding to the first row of image data in the upcoming focal plane) in linear units. The gain is represented using a 7 bit fixed point 3.4 format. The focal plane ordering corresponds to the scalar version of focal plane numbering format. Inactive focal planes (focal planes not part of the readout) are set to 0x00h. |
| Packing Modulo | 2 | 16-bit integer defining the packing modulo of the pixel data (see discussion of FIGS. 7a-7c). Modulo 0 can mean modulo equal Total Pixels X (see above). |
| User | Variable | Reserved for system capability expansion. |
| Padding | Variable | Expands the length of the embedded data section to be equal to a line of the image data with a preceding line header and trailing line footer. The value of padding bytes is not specified. |

Referring to the above tables, each of the descriptors is discussed further below. Furthermore, although a specific number of bytes are used in embodiments throughout the specification for fixed and dynamic descriptors, any number of bytes may be utilized in other embodiments as appropriate to specific applications.

"Data identification (ID)" is a fixed descriptor of 5 bytes that can be used at the start of the embedded data. The value of which can be represented in an ASCII character string such as (but not limited to) "PICAM".

"Device ID" is a fixed descriptor of 4 bytes that can be used as a device identification word.

"Revision ID" is a fixed descriptor of two bytes in length. "Revision ID" is a silicon revision word and describes the version of the imager array.

"Manufacturer ID" is a fixed descriptor of 8 bytes in length. "Manufacturer ID" is a manufacturer identifier.

"Array format, M, N" is a fixed descriptor of 1 byte in length. "Array format" describes the number of focal planes in the imager array. In several embodiments, the array format specifies values M and N, where M is the number of focal planes per row in the imager array and N is the number of focal plane per column in the imager array.

"Start of focal plane image data capture time tag counter frequency" is a fixed descriptor of 2 bytes in length that indicates the frequency used to generate the start of focal plane image data capture time tag counter frequency values. In several embodiments, the frequency is represented using a 16-bit fixed precision 8.8 format (0 to 255.99609 MHz in 0.00390625 MHz steps). In other embodiments, any of a variety of data values can be utilized to represent the packet time tag values with precision appropriate to the specific application.

"Active focal plane" is a dynamic descriptor of 8 bytes in length. The "active focal plane" descriptor describes the focal planes that are read out in the upcoming packet. Certain embodiments provide for support of as many as 64 focal planes. In other embodiments, the number of focal planes can exceed 64 focal planes and the embedded data indicates the appropriate number of focal planes. Each bit corresponds to a single focal plane within the imager array with a 1 indicating that the packet contains image data captured using the focal plane.

"Total pixels X" is a dynamic descriptor of 2*M*N in length that describes the number of pixels being read out per focal plane in the X axis direction. In several embodiments, each pixel has a 16 bit word associated with it. Inactive focal planes (focal planes not part of the readout) can be set to 0x0000h.

"Total pixels Y" is a dynamic descriptor of 2*M*N in length that describes the number of pixels being readout per focal plane along the Y axis. Inactive focal planes (focal planes not part of the readout) can be set to 0x0000h.

"Integration Time" is a dynamic descriptor of 3*M*N in length that describes the integration time per focal plane (corresponding to the first row of data in the upcoming packet) in units of microseconds. Inactive focal planes (focal planes not part of the readout) are set to 0x000000h.

"Analog Gain" is a dynamic descriptor of 1*M*N in length that describes the analog gain per focal plane (corresponding to the first row of data in the upcoming packet) in linear units. In several embodiments, the gain is represented using an 8 bit fixed point 5.3 format (0 to 31.875x in 0.125 steps) value. Inactive focal planes (focal planes not part of the readout) are set to 0x00h.

"Digital Gain" is a dynamic descriptor of 1*M*N in length that describes the digital gain per focal plane (corresponding to the first row of data in the upcoming packet) in linear units. In several embodiments, the gain is represented using an 7 bit fixed point 3.4 format. Inactive focal planes (focal planes not part of the readout) are set to 0x00h.

"Packing Modulo" is a dynamic descriptor of 2 bytes length that defines the packing modulo process used to interleave pixel data from the active focal planes into a line of image data.

"User" is a dynamic descriptor of variable length that can be utilized to support system capability expansion.

"Padding" is a dynamic descriptor of variable length that allows for expansion of the length of the embedded data section to be equal to a line of the image data with preceding line header and trailing line footer. The value of padding bytes is not specified and is variable depending on the needs of the particular data section.

Although specific pieces of additional data describing an imager array in specific formats are disclosed above, the additional data describing an imager array (if any) transmitted by an imager array in accordance with an embodiment of the invention depends upon the requirements of a specific application. In many embodiments, a combination of the above pieces of additional data and/or other pieces of additional data describing the imager array are transmitted so that a processor receiving the information can reconstruct images from the image data captured by a imager array in accordance with embodiments of the invention. Accordingly, the manner in which image data is transmitted between the imager array and the processors is not limited in any way to transmissions that include a specific set of additional data describing the imager array. Specific sets of additional data describing an imager array including (but not limited to) one or more of the dynamic descriptors identified above can, however, facilitate the reconstruction of images by a processor.

Additional Data Describing a Line of Image Data

Imager arrays in accordance with many embodiments of the invention format image data captured by groups of pixels within one or more focal planes into a line of image data and can transmit the line of image data with additional data describing the line of image data to other devices. A single line of image data typically corresponds to image data captured by a row or a column of pixels within each active focal plane in an imager array. In many embodiments, however, a line of image data can correspond to image data captured from pixels in one or more rows of one or more active focal planes (see discussion of FIGS. 7a-7c below). In the context of the transmission of packets of data illustrated in FIG. 4, lines of image data (possibly including a line header containing additional data describing the line of image data and a line footer) are transmitted within a MIPI container between line blanking intervals.

Figure 5:
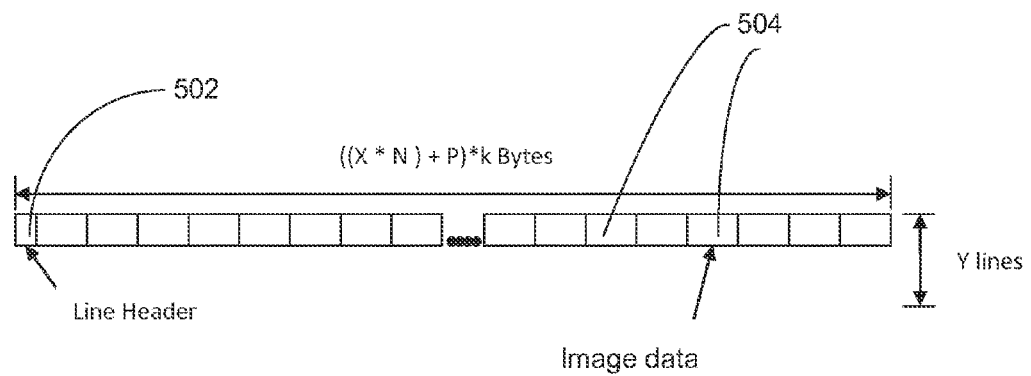
FIG. 5 is an illustration of a transmission of a line of image data in accordance with an embodiment of the invention.

The transmission of a line of image data and a line header containing additional data describing the line of image data by an imager array in accordance with an embodiment of the invention is conceptually illustrated in FIG. 5. The line of image data 500 begins with a line header 502 containing additional data that describes the line of image data, followed by captured image data 504, and terminates with a footer indicating that the particular line of image data is complete. Referring back to FIG. 4, when a line of image data is transmitted in accordance with a transmission format similar to the MIPI interface format, the line header and line footer are located within the data 414 (i.e. are distinct from the packet header (PH) 424 and the packet footer (PF) 426). Although much of the discussion refers to the inclusion of additional data describing a line of image data in the line header, in many embodiments additional data describing the imager array can also be included in a line header. Furthermore, additional information describing a line of image data need not be located within a line header and can be communicated elsewhere with respect to the image data.

A variety of different control schemes can be utilized to control the timing of the capture of image data by different pixels within the focal planes of an imager array and with respect to the transmission of the captured image data by the imager array. In several embodiments, image data from a specific focal plane is captured one row (or column) of pixels at a time. As noted above, the focal planes in an imager array can be separately controlled. Therefore, the sequence with which rows of image data are read from each focal plane can vary depending upon control parameters including, but not limited to, exposure time associated with each focal plane. When image data is captured by the pixels, the image data is read out. The image data is not typically transmitted directly from the pixels but is buffered. The amount of data that is buffered typically depends upon the rate at which image data is captured and the rate with which image data can be transmitted off-chip by the imager array. As discussed above, the amount of buffered pixel data can also depend upon the number of active focal planes.

In numerous embodiments, a line of image data may be a row of pixel data from each active focal plane, a column of pixel data from each active focal plane or any other grouping of image data captured by pixels within one or more focal planes. Accordingly, the term "line" is a generic term. In many embodiments, the line of image data includes image data captured from pixels in a single focal plane. In other embodiments, the line of image data includes image data captured from multiple focal planes. Additional data describing the line of image data allows software or hardware on a receiver to determine from which focal plane(s), which row/column and/or which pixels on that focal plane captured specific image data within a line of image data.

In several embodiments, the image data is transmitted using the RAW8 or RAW10 data formats defined within the MIPI interface format, although other data formats can be supported as necessary including formats involving 8 bits per pixel and formats involving 10 bits per pixel.

In a variety of embodiments, the size of image data with accompanying line headers containing additional data describing the image data transmitted by a imager array when capture of a light field occurs (i.e. including all the image data associated with the images of the scene captured by each of the focal planes in the imager array) in bytes can be calculated using the following equation:

$$((X*N)+P)*Y*k$$

where X is the total pixels in an row of pixels within a specific focal plane,
Y is the total pixels along a Y axis,
N is the number of focal planes in an array,
P is the line header length, and
k is a scale factor that can be used to account for 10 bits per pixel transmission (where 8 bits per pixel (bpp) yields k=1 and 10 bpp yields k=1.25).

In the case of 10 bits per pixel transmission, each line of data is padded with additional pixels to provide an integer multiple of 4. Padding pixels can have a value of 0x3Fh.

In many embodiments, the additional data describing a line of image data can include one or more of timing information concerning the frame to which the image data from each focal plane belongs, and the row (column) number in each focal plane from which image data in the line of image data is read out. In a number of embodiments, each line of data is preceded by a line header containing the additional information describing the line of image data, which provides the processor with the necessary information about the line data to reconstruct the images captured by the focal planes. The following table provides additional data that can be included in a line header in accordance with an embodiment of the invention to enable reconstruction of images by a processor:

| Name | Length (Bytes) | Description |
|---|---|---|
| Start of focal plane image data capture time tag | <=4*M*N | A (nominally) 32-bit number for each focal plane corresponding the relative start time for the readout of the focal plane. The start time of a focal plane capturing image data is captured from a free running 32 bit counter internal to the transmitter counting in units of clock cycles where the frequency of the counter is defined in the embedded image data line header. The focal plane ordering corresponds to the scalar version of the focal plane numbering format. Inactive focal planes (as defined in the active focal planes field of the embedded data in the packet header) shall have their start of focal plane image data capture time tag omitted. Note in 10 bits per pixel transmission mode the individual bytes are expanded to 10 bits and padded with 2 LSBs = 00. |
| Row Numbers | <=2*M*N | A (nominally) 16-bit line number for each focal plane indicating from which physical row in the focal plane the subsequent data is from. Nonphysical rows (virtual rows) that may be transmitted can have their row number set to 0xffffh. The focal plane ordering corresponds to the scalar version of the focal plane numbering format. Inactive focal planes (as defined in the active focal planes field in the embedded data of the packet header) shall have their line number omitted. Note in 10 bits per pixel transmission mode the individual bytes are expanded to 10 bits and padded with 2 LSBs = 00. |
| Padding | Variable (0 or 2) | Variable padding range to ensure the line header falls on a modulo 5 byte boundary in the case of 10 bits per pixel transmission. Padding words shall have the value of 0x3Fh |

Referring to the above table, each of the descriptors is discussed further below. Furthermore, although a specific number of bytes are used in embodiments throughout the specification for fixed and dynamic descriptors, any number of bytes may be utilized in other embodiments as appropriate to specific applications.

"Start of focal plane image data capture time tag" is equal to or less than 4*M*N bytes in length and describes a (nominally) 32 bit number for each focal plane corresponding the relative start time for the readout of the focal plane. The start of the image data associated with a pixel can be captured from a free running 32 bit counter internal to the transmitter within the imager array counting in units of clock cycles where the frequency of the counter is defined in the embedded data. Inactive focal planes (as defined in the active focal plane field of the embedded data of the packet header) can have their start of focal plane image data capture time tag omitted. Note in 10 bits per pixel transmission mode the individual bytes are expanded to 10 bits and padded with 2 LSBs=00.

"Row Numbers" is equal to or less than 2*M*N bytes in length and describes a (nominally) 16 bit line number for each focal plane indicating from which physical row or line in the focal plane the subsequent image data is from (the appropriate number of bits depends upon the number of lines of pixels and need not be 16 bits). Nonphysical rows or lines (virtual rows or lines) that may be transmitted can have their row or line number set to 0xffffh. Inactive focal planes (as defined in the active focal plane field of the embedded data) can have their line number omitted. In 10 bits per pixel transmission mode, the individual bytes are expanded to 10 bits and padded with 2 LSBs=00.

"Padding" is of variable bytes in length (such as 0 or 2 in certain embodiments). A variable padding range enables the line header to fall on a modulo 5 byte boundary in the case of 10 bits per pixel transmission. In several embodiments, padding words have the value of 0x3Fh.

Although specific pieces of additional data describing a line of image data in specific formats are disclosed above, the additional data describing a line of image data (if any) transmitted accompanying a line of image data by a imager array in accordance with an embodiment of the invention depends upon the requirements of a specific application. In many embodiments, a combination of the above pieces of additional data and/or other pieces of additional data are transmitted in a line header so that a processor receiving the additional data describing the lines of image data can reconstruct images from the image data captured by a imager array in accordance with embodiments of the invention. Accordingly, the manner in which data is transmitted between the imager array and the processor is not limited in any way to transmissions that include a specific set of additional data describing lines of image data. Specific sets of additional data describing lines of image data can, however, facilitate the reconstruction of images by a processor.

Including Additional Data Describing Imager Array in Line Headers

As discussed above, additional data describing an imager array may be utilized to allow a receiver to determine the structure of image data in a packet and reconstruct images. In certain embodiments, the additional data describing an imager array can be included in a line header that may also contain additional data describing a line of image data. This can be advantageous in certain embodiments where the packet header length may be limited or the separate transmission of additional information describing an imager array is not desirable.

The following table includes additional data describing an imager array that can be included in a line header in accordance with an embodiment of the invention to enable reconstruction of images by a processor:

| Name | Length (Bytes) | Description |
|---|---|---|
| Free running mode | 2 | Fixed value of ASCII code for "FR". Note in 10 bits per pixel transmission mode the individual bytes are expanded to 10 bits and padded with 2 LSBs = 00. |
| Packet counter | 2 | Arbitrary packet number counter. Initialized to zero upon reset. Incremented by one for every packet transmitted in accordance with the MIPI interface format. Wraps around at 0xffff. Note in 10 bits per pixel transmission mode the individual bytes are expanded to 10 bits and padded with 2 LSBs = 00. |
| Row number | <=2*M*N | A (nominally) 16-bit line number for each focal plane indicating from which physical row in the focal plane the subsequent data is from. Nonphysical rows (virtual rows) that may be transmitted can have their row number set to 0xffffh. The focal plane ordering corresponds to the scalar version of the focal plane numbering format. Inactive focal planes (as defined in the active focal planes field of the embedded |

-continued

| Name | Length (Bytes) | Description |
|---|---|---|
| | | data) shall have their line number omitted. Note in 10 bits per pixel transmission mode the individual bytes are expanded to 10 bits and padded with 2 LSBs = 00. |
| Padding | Variable (0 or 2) | Variable padding range to ensure the line header falls on a modulo 5 byte boundary in the case of 10 bits per pixel transmission. Padding words shall have the value of 0x3Fh |

Referring to the above table, each of the descriptors is discussed further below. Furthermore, although a specific number of bytes are used in embodiments throughout the specification for fixed and dynamic descriptors, any number of bytes may be utilized in other embodiments as appropriate to specific applications.

"Free running mode" is equal to 2 bytes in length and describes a fixed value of ASCII code for "FR". Note in 10 bits per pixel transmission mode the individual bytes are expanded to 10 bits and padded with 2 LSBs=00.

"Packet counter" is equal to 2 bytes in length and describes an arbitrary packet number counter. This may be initialized to zero upon reset, incremented by one for every packet transmitted in the MIPI interface format and wraps around at 0xffff. Note in 10 bits per pixel transmission mode the individual bytes are expanded to 10 bits and padded with 2 LSBs=00.

"Row Number" is equal to or less than 2*M*N bytes in length and describes a (nominally) 16 bit row (column) number for each focal plane indicating from which physical row or line in the focal plane the subsequent image data is from (the appropriate number of bits depends upon the number of lines of pixels and need not be 16 bits). Non-physical rows or lines (virtual rows or lines) that may be transmitted can have their row or line number set to 0xffffh. Inactive focal planes (as defined in the active focal plane field of the embedded data) can have their line number omitted. In 10 bits per pixel transmission mode, the individual bytes are expanded to 10 bits and padded with 2 LSBs=00.

"Padding" is of variable bytes in length (such as 0 or 2 in certain embodiments). A variable padding range enables the line header to fall on a modulo 5 byte boundary in the case of 10 bits per pixel transmission. In several embodiments, padding words have the value of 0x3Fh.

Although specific pieces of additional data describing an imager array that can be included in a line header are disclosed above, the additional data transmitted with a line of image by an imager array in accordance with an embodiment of the invention depends upon the requirements of a specific application. In many embodiments, a combination of the above pieces of additional data describing the imager array and/or other pieces of additional data describing the imager array and/or one or more lines of image data are transmitted in a line header so that a processor receiving the information can reconstruct images from the image data captured by the imager array. Accordingly, the manner in which data is transmitted between the imager array and a receiver is not limited in any way to transmissions that include a specific set of additional data in the line headers or packet headers.

Light Field Capture and Transmission Processes

Imager arrays in accordance with many embodiments of the invention can capture image data using multiple focal planes and transmit the image data and additional information describing the image data to a processor. As noted above, the need to transmit the image data and additional data describing the image data within a specific container may influence the manner in which the data is transmitted. As noted above, the additional data describing the image data typically depends upon the manner in which the image data is captured and the characteristics of the imager array used to capture the light field.

Figure 6:
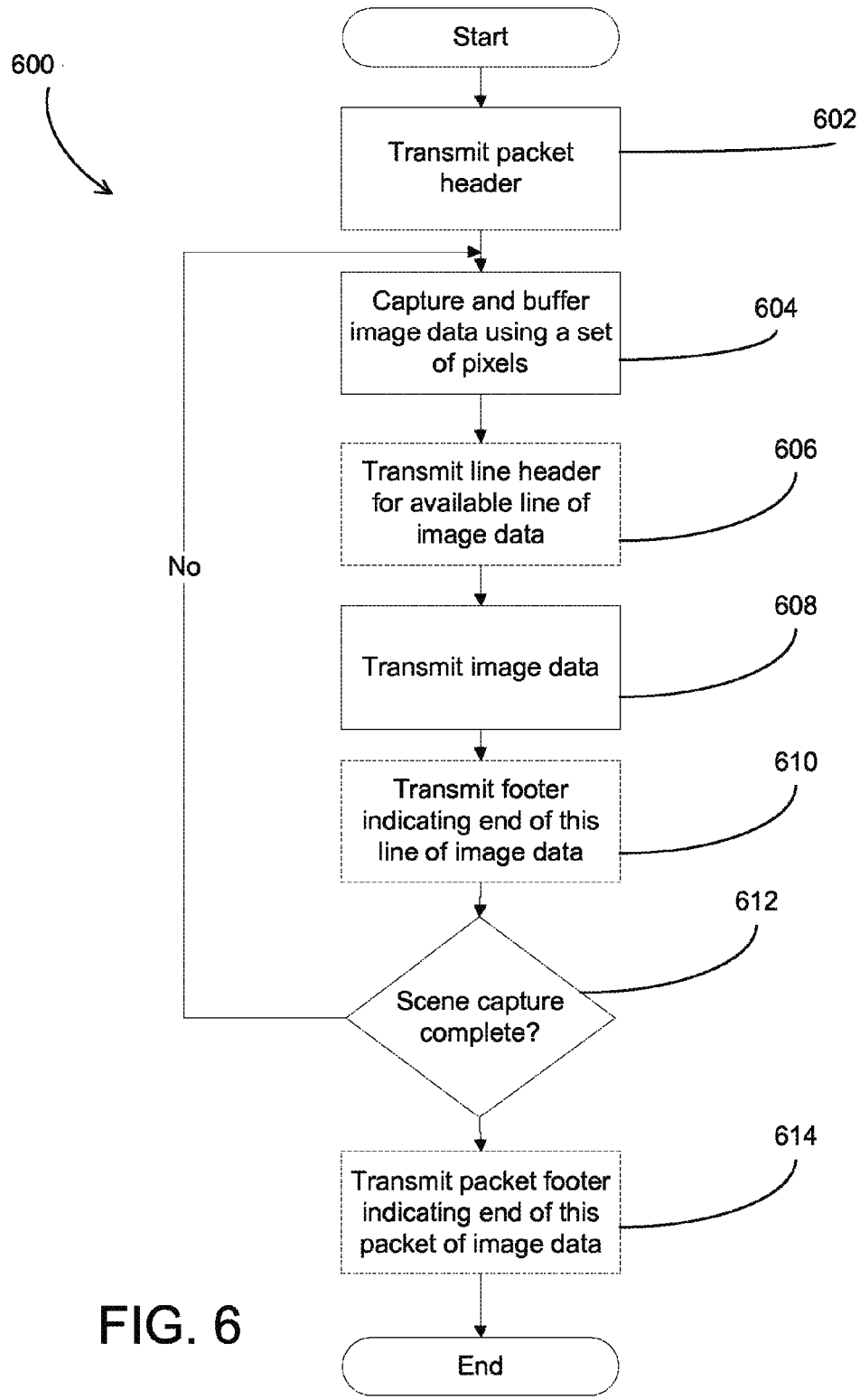
FIG. 6 is a process for transmitting image data captured by an imager array in accordance with an embodiment of the invention.

A process for capturing a light field and transmitting the image data and additional data describing the image data to an external device such as (but not limited to) a processor using an imager array in accordance with an embodiment of the invention is illustrated in FIG. 6. The process 600 can commence by transmitting a packet header (602) that includes additional data describing the imager array. As noted above, the transmission of a packet header can be optional. During the process, image data is captured (604) by the pixels in the imager array. In various embodiments, capturing (604) image data involves controlling the pixels and pixel settings used when capturing the image data. In certain embodiments, the pixel settings can be performed globally per focal plane. In many embodiments, the process also includes resetting the pixels after the capture of image data.

In many embodiments, a line header including additional data describing the a line of image data is transmitted (606) by the imager array, and then a line of captured image data is transmitted (608). As noted above, the line of image data can include image data from one or more focal planes and the additional data can identify the groups of pixels and/or the focal planes that captured the image data within the line of image data. Upon completion of the transmission of a line of image data, a line footer can optionally be transmitted (610) by the imager array to indicate that the transmission of the line of image data is complete. The process repeats until a determination (612) is made that the capture of the light field (i.e. a plurality of two dimensional images captured from different viewpoints) using the plurality of focal planes is complete. Following the completion of the transmission of image data by the imager array, the imager array can optionally transmit (614) a packet footer that indicates the completion of the packet of data. As noted above, the specific manner in which the image data and the additional data describing the image data is transmitted is often dictated by an interface format (e.g. the MIPI interface format).

In several embodiments, line headers, line footers and/or packet footers are omitted based on the image data being configured to capture a predetermined amount of image data and/or the transmission of the captured image data in a predetermined sequence. Although a specific process for transmitting image data and additional data describing the image data is discussed above with respect to the process illustrated in FIG. 6, any of a variety of processes that enable the transmission of lines of image data captured using different focal planes and additional data that can be utilized to construct a plurality of images from the lines of image data can be utilized in accordance with embodiments of the invention. Processes for transmitting image data captured in a predetermined manner by an imager array are discussed further below.

Interleaving Image Data from Multiple Focal Planes

In a number of embodiments, image data from multiple focal planes can be interleaved in a predetermined manner to simplify the transmission of image data and reduce the amount of additional data describing the image data that is transmitted accompanying the image data. In many embodiments, imager arrays use a "modulo" scheme for interleaving the captured image data into a packet in a predetermined manner. A modulo scheme involves capturing and transmitting image data from the same group of pixels in each active focal plane (or each focal plane in a group of focal planes) within an imager array, such as the same row, rows, column, or columns. In other embodiments, a modulo scheme can involve specifying the specific row (or column) from a set of focal planes and then reading out corresponding pixels or groups of pixels from each specified row (or column).

Three different modulo processes for capturing and transmitting image data in accordance with embodiments of the invention are illustrated in FIGS. 7a-7c. A line of image data transmitted in accordance with a first modulo process 726 is illustrated in FIG. 7a and involves transmitting the first pixel 702 from a row selected from each of a total of twenty focal planes before transmitting the second pixel 704 from the selected row from each of the 20 focal planes. Accordingly, the process illustrated in FIG. 7a can be referred to as a modulo one process. As can readily be appreciated, the number of focal planes is arbitrary. In several embodiments, the specific rows transmitted by each focal plane can be specified in additional data contained within a line header transmitted prior to the transmission of the image data.

Similarly, a line of image data transmitted in accordance with a second modulo process 728 is conceptually illustrated in FIG. 7b and involves transmitting pairs of pixels from a selected row in each of the active focal planes. In the illustrated embodiment, the first 706 and second 708 pixels from a selected row in each of a total of twenty focal planes is transmitted before transmitting the third 710 and fourth 712 pixels of the selected rows. The process repeats transmitting pairs of pixels from the selected row in each focal plane until the transmission of the image data captured by the selected rows of pixels is complete. Accordingly, the process illustrated in FIG. 7b can be referred to as a modulo two process.

A line of image data transmitted in accordance with a third modulo process 730 is conceptually illustrated in FIG. 7c and involves transmitting the first 714, second 716 and third 718 pixels of a row selected from each of a total of twenty active focal planes before transmitting the fourth 720, fifth 722 and sixth pixels (not shown) from each of the selected rows. The process repeats transmitting sets of three pixels from the relevant row in each focal plane until the transmission of the image data captured by the selected rows of pixels is complete. Accordingly, the process illustrated in FIG. 7c can be referred to as a modulo three process.

For each modulo transmission process, the transmission of image data from selected rows in each active focal plane can continue until all of the pixels in all of the focal planes are transmitted. In embodiments where different modulo transmission processes are supported, the imager array can provide additional data indicating the modulo process that is being utilized. In addition, the imager array can provide additional data describing the image data to enable reconstruction of images from the image data including (but not limited to) additional data indicating the active focal planes and/or information with respect to each line of image data specifying the selected rows (columns) in each active focal plane from which the image data is being read out. Although specific transmission processes are discussed above, image data can be transmitted in any order in accordance with embodiments of the invention, and is not limited to interleaving image data from multiple focal planes in a modulo transmission process.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method of transmitting image data, comprising:
    capturing image data using a plurality of active cameras in an array of cameras;
    generating at least one line of image data by interleaving the image data captured by the plurality of active cameras using a predetermined process, wherein the predetermined process is selected from a plurality of predetermined processes for interleaving captured image data;
    generating additional data providing information for deinterleaving a plurality of images from the at least one line of image data, wherein the additional data includes information on which cameras in the array of cameras are active and providing image data and data indicating the predetermined process used to interleave the captured image data; and
    transmitting the at least one line of image data and the additional data.

2. The method of claim 1, wherein the additional data describes said array of cameras.

3. The method of claim 2, wherein the additional data includes data selected from a group consisting of additional data describing:
    a number of active cameras;
    dimensions of the array of cameras;
    a number of pixels in each dimension of at least one of said plurality of active cameras;
    an integration time for pixels in at least one of said plurality of active cameras; and
    a gain for pixels in at least one of said plurality of active cameras.

4. The method of claim 3, wherein the additional data describing the gain for pixels in the at least one of said plurality of active cameras includes additional data describing an analog gain for pixels in said at least one of said plurality of active cameras and additional data describing the digital gain for pixels in said at least one of said plurality of active cameras.

5. The method of claim 1, wherein:
    each of the plurality of active cameras comprises an array of pixels including a plurality of rows of pixels that also form a plurality of columns of pixels; and
    the predetermined process selected from the plurality of predetermined processes for interleaving captured image data comprises interleaving image data from a row selected from each of the active cameras.

6. The method of claim 5, wherein the predetermined process selected from the plurality of predetermined processes for interleaving captured image data comprises using a modulo process, where the modulo process involves interleaving image data captured by pixels in the selected rows of the plurality of active cameras by interleaving a predetermined number of pixels from each of the selected rows.

7. The method of claim 1, wherein the additional data describes at least one of the at least one line of image data.

8. The method of claim 7, wherein the additional data includes data selected from the group consisting of additional data describing:
a time at which each of the plurality of active cameras started capturing the image data; and
row numbers of rows in each of the plurality of active cameras used to capture image data used to generate the at least one line of image data.

9. The method of claim 1, further comprising:
packetizing the at least one line of image data and the additional data to produce at least one packet of data; and
wherein transmitting the at least one line of image data and the additional data further comprises transmitting the at least one packet of data.

10. The method of claim 9, wherein:
the at least one packet of data comprises a packet header including at least a portion of the additional data and at least one of the at least one line of image data; and
the additional data included in the packet header describes the array of cameras.

11. The method of claim 9, wherein the at least one packet of data further comprises a packet footer indicating the end of the transmission of the at least one line of the at least one line of image data.

12. The method of claim 9, wherein:
the at least one packet of data comprises at least one line of the at least one line of image data and a line header associated with each of the at least one line of the at least one line of image data; and
each line header includes additional data describing a line of image data with which the line header is associated.

13. The method of claim 12, wherein the line header further comprises additional data describing the array of cameras.

14. The method of claim 13, further comprising:
pausing transmission during frame blanking intervals;
transmitting the at least one line of the at least one line of image data and the additional data between frame intervals; and
pausing during the transmission of the plurality of lines of image data and the additional data during line blanking intervals.

15. The method of claim 1, further comprising continuously transmitting the at least one line of image data and the additional data until all of the data is transmitted.

16. The method of claim 1, wherein each camera in the array of cameras has a different field of view.

* * * * *